United States Patent
Spetalnick

(10) Patent No.: US 9,715,333 B2
(45) Date of Patent: *Jul. 25, 2017

(54) METHODS AND SYSTEMS FOR IMPROVED DATA INPUT, COMPRESSION, RECOGNITION, CORRECTION, AND TRANSLATION THROUGH FREQUENCY-BASED LANGUAGE ANALYSIS

(71) Applicant: Jeffrey R. Spetalnick, New York, NY (US)

(72) Inventor: Jeffrey R. Spetalnick, New York, NY (US)

(73) Assignee: Abby L. Siegel, Armonk, NY (US)

( * ) Notice: Subject to any disclaimer, the term of this patent is extended or adjusted under 35 U.S.C. 154(b) by 193 days.

This patent is subject to a terminal disclaimer.

(21) Appl. No.: 14/179,994

(22) Filed: Feb. 13, 2014

(65) Prior Publication Data

US 2014/0164977 A1    Jun. 12, 2014

Related U.S. Application Data

(63) Continuation of application No. 12/624,988, filed on Nov. 24, 2009, now Pat. No. 8,671,357.

(Continued)

(51) Int. Cl.
*G06F 3/0481* (2013.01)
*G06F 3/0484* (2013.01)
(Continued)

(52) U.S. Cl.
CPC ...... *G06F 3/04842* (2013.01); *G06F 3/04817* (2013.01); *G06F 17/276* (2013.01); *G06F 3/0237* (2013.01)

(58) Field of Classification Search
CPC .............. G06F 17/276; G06F 3/04842; G06F 3/04817; G06F 3/017; G06F 3/0481;
(Continued)

(56) References Cited

U.S. PATENT DOCUMENTS 5,128,672 A * 7/1992 Kaehler ................ G06F 3/0238
341/23
5,689,253 A   11/1997 Hargreaves
(Continued)

FOREIGN PATENT DOCUMENTS

EP    0 676 781 A    10/1995
EP    1724692 A2    11/2006
(Continued)

*Primary Examiner* — Rinna Yi
(74) *Attorney, Agent, or Firm* — Cowan, Liebowitz & Latman, P.C.; Mark Montaguge

(57) ABSTRACT

System and method for improving data input by using word frequency to text predict input. Other systems and methods include analyzing words already contained in a document (e.g. spell checking and OCR) and using word frequency to create a proxy system to reduce the space required to store data, allowing for more efficient usage of storage and enhancing the embedded content of matrix codes. The system displays the most common words in a language based upon the previously entered or displayed word(s), or the previously entered or displayed character or characters. Words with the most common frequency of use with the prior word(s) are displayed in a table to enable the user to quickly select one of the displayed words for rapid data entry. The input device can be a touch-sensitive display or non-touch sensitive type device.

72 Claims, 19 Drawing Sheets

Related U.S. Application Data

(60) Provisional application No. 61/200,181, filed on Nov. 25, 2008, provisional application No. 61/163,179, filed on Mar. 25, 2009.

(51) Int. Cl.
*G06F 17/27* (2006.01)
*G06F 3/023* (2006.01)

(58) Field of Classification Search
CPC ............ G06F 3/0482; G06F 3/04883; G06F 3/04886; G06F 3/0489; G06F 9/4443; G06F 2340/145
USPC ........ 715/259, 261, 273, 773, 825, 863, 864
See application file for complete search history.

(56) References Cited

U.S. PATENT DOCUMENTS

| | | | | |
|---|---|---|---|---|
| 5,774,109 A * | 6/1998 | Winksy | ............... | G06F 3/0485 345/169 |
| 5,778,404 A * | 7/1998 | Capps | ............... | G06F 17/24 345/179 |
| 5,797,098 A * | 8/1998 | Schroeder | ............ | G06F 3/0237 379/355.05 |
| 6,803,905 B1 | 10/2004 | Capps et al. | | |
| 2002/0118175 A1 | 8/2002 | Liebenow et al. | | |
| 2003/0144830 A1 | 7/2003 | Williams | | |
| 2004/0070567 A1 * | 4/2004 | Longe | ............... | G06F 3/0236 345/156 |
| 2004/0168131 A1 * | 8/2004 | Blumberg | ............ | G06F 3/0237 715/261 |
| 2004/0174400 A1 * | 9/2004 | Herigstad | ............ | G06F 3/0236 715/864 |
| 2004/0183833 A1 * | 9/2004 | Chua | ............... | G06F 3/0237 715/773 |
| 2004/0205534 A1 | 10/2004 | Koelle | | |
| 2005/0210402 A1 * | 9/2005 | Gunn | ............... | G06F 3/0236 715/773 |
| 2006/0097991 A1 | 5/2006 | Hotelling et al. | | |
| 2006/0119582 A1 * | 6/2006 | Ng | ............... | G06F 3/04883 345/168 |
| 2006/0190256 A1 * | 8/2006 | Stephanick | ............ | G06F 17/2735 704/252 |
| 2006/0265648 A1 * | 11/2006 | Rainisto | ............ | G06F 3/0237 715/259 |
| 2007/0074131 A1 * | 3/2007 | Assadollahi | ............ | G06F 3/0237 715/816 |
| 2007/0219954 A1 | 9/2007 | Ray et al. | | |
| 2007/0233463 A1 * | 10/2007 | Sparre | ............ | G06F 17/276 704/10 |
| 2007/0298818 A1 * | 12/2007 | Krutik | ............ | H04M 1/72547 455/466 |
| 2008/0033713 A1 | 2/2008 | Brostrom | | |
| 2008/0072143 A1 * | 3/2008 | Assadollahi | ............ | G06F 3/04892 715/261 |
| 2008/0122796 A1 | 5/2008 | Jobs et al. | | |
| 2008/0167858 A1 * | 7/2008 | Christie | ............ | G06F 3/0237 704/10 |
| 2008/0218950 A1 * | 9/2008 | Morrison | ............ | G06F 1/1616 361/679.3 |
| 2008/0304892 A1 | 12/2008 | Baker | | |
| 2009/0077464 A1 | 3/2009 | Goldsmith et al. | | |
| 2009/0079702 A1 | 3/2009 | Colley | | |
| 2009/0195506 A1 * | 8/2009 | Geidl | ............ | G06F 3/04886 345/168 |
| 2009/0213081 A1 | 8/2009 | Case, Jr. | | |
| 2009/0237359 A1 | 9/2009 | Kim et al. | | |
| 2009/0251422 A1 | 10/2009 | Wu et al. | | |
| 2010/0073329 A1 | 3/2010 | Raman et al. | | |
| 2010/0121876 A1 * | 5/2010 | Simpson | ............ | G06F 3/0237 707/769 |
| 2010/0131900 A1 | 5/2010 | Spetalnick | | |
| 2010/0277424 A1 | 11/2010 | Chang et al. | | |
| 2011/0007004 A1 | 1/2011 | Huang et al. | | |
| 2011/0018812 A1 | 1/2011 | Baird | | |
| 2011/0084922 A1 | 4/2011 | Rider et al. | | |
| 2011/0239153 A1 | 9/2011 | Carter et al. | | |
| 2011/0314405 A1 | 12/2011 | Turner et al. | | |

FOREIGN PATENT DOCUMENTS

| | | |
|---|---|---|
| EP | 1923796 A1 | 5/2008 |
| KR | 20100024292 A | 3/2010 |
| WO | 2005036413 A1 | 4/2005 |
| WO | 2010/099835 A1 | 9/2010 |

* cited by examiner

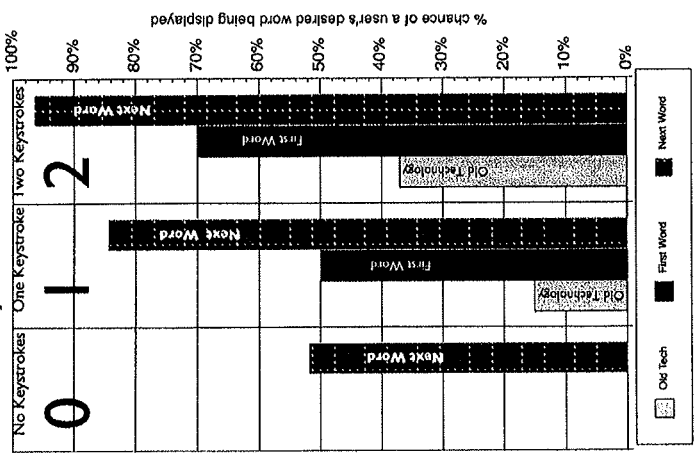

METHODS AND SYSTEMS FOR IMPROVED DATA INPUT, COMPRESSION, RECOGNITION, CORRECTION, AND TRANSLATION THROUGH FREQUENCY-BASED LANGUAGE ANALYSIS

REFERENCE TO RELATED APPLICATIONS

This application is a continuation of application Ser. No. 12/624,988, filed Nov. 24, 2009; which in turn, claims priority of U.S. provisional application No. 61/200,181, filed Nov. 25, 2008, and U.S. provisional application No. 61/163,179, filed Mar. 25, 2009, the disclosures of which are incorporated herein by reference.

BACKGROUND OF THE INVENTION

Field of the Invention

The present invention relates generally to a broad improvement of input and output of data and provides significant improvement to a number of areas including data entry through keyboards, keypads, touchpads, scanned entry, and typed entry as well as output based opportunities in data compressions for improved storage and transmission that can be used to reduce the size of stored files as well as increase the usefulness of coded data. More particularly, the present invention relates to systems and methods for improved data input using frequency-based language analysis.

The data input portion of the invention relates generally to input devices, such as keyboards, keypads and touchpads, in connection with improved scanning of documents, spell checking, and predictive-based menus for language-based word entry. The data output portion of the invention relates to methodologies for data compression, storage and transmission, as well as expanding the ability of matrix and bar codes to convey increased amounts of information.

Description of Related Art

As microprocessor based devices have been reduced in physical size, a great demand has arisen for keyboards and/or touchpads (collectively, "keyboards") that can be readily used with such devices, especially for the purpose of standard language (e.g., English-language) text entry. Various schemes exist for encoding various alphabets on small keyboards for use with such devices, but these keyboards have not completely satisfied this demand. For example, a number of handheld electronic planner/calendar products utilize different types of alphabetized keyboards for entering text. Although some of these keyboards follow the English character set layout popularized by QWERTY style keyboards ("QWERTY" stands for the organization of six letters on the second row of the keyboard), the size of the keys and the spacing between keys have been reduced to the point that the keyboards are not well-suited for rapid text entry. Users of such products are forced to use one or two fingers at a time to type text, typically referred to as the "hunt and peck" method of typing. The QWERTY layout is used on most computer keyboards as well as recently introduced expanded cellular devices, such as Apple's iPhone, Research in Motion's BlackBerry and the like. Unfortunately, small QWERTY layout keyboards are inherently difficult to use at a quick pace without introducing meaningful number of typographical errors.

The keyboard in Apple's iPhone, as well as various other currently existing portable electronic devices, employs a full touch-screen display that is designed to display different key images (e.g., a, b, c . . . z) in the familiar QWERTY layout and a variety of predefined sets of key images. But for many users, the size of each individual key image still is regarded as relatively small thereby making the keyboard user interface difficult to use to type messages and other word entry at a relatively quick rate and without errors.

Many current "standard-type" cellular telephones have a numeric keypad where users are able to generate text messages by depressing each keypad element (e.g, the "2" key) one or multiple times to select a desired letter associated with that keypad element. For example, the "2" key can be depressed two times during a text entry to insert the letter "b' into the text entry. Clearly, this technique for creating text is painfully slow, requiring on average two keystrokes per letter.

Other types of keyboards as well as dynamic keyboards and keypads are disclosed in U.S. Pat. No. 5,128,672, which is incorporated hereby by reference. This patent also describes a "dynamic predictive keyboard" that displays different character set layouts based on the previously entered character. While the technique disclosed in this patent seeks to increase the speed at which words are typed, significant improvements in enabling quicker text entry still are needed. In addition, the disclosed technique does not address other important issues including preventing or reducing spelling mistakes in text entry, increasing text entry rates in devices that do not employ full touch-screen interfaces, and other matters addressed below. Also many users do not type well and find it hard to tap small buttons without errors.

OBJECTS AND SUMMARY OF THE INVENTION

Therefore, and in view of the foregoing, it is an object of the present invention to provide various systems and methods for providing improved data input, particularly text input, as compared to existing technologies.

It is another object of the present invention to provide various systems and methods that enable users to enter text having fewer errors, such as typographical errors, as compared to existing devices.

It is a further object of the present invention to provide various systems and methods that enable users to quickly enter text in an easy and non-complicated manner.

It is yet another object of the present invention to provide various processes and techniques for enabling a user to more quickly enter text using an electronic device that does not include a QWERTY style keyboard.

It is yet a further object of the present invention to provide various systems and methods that provide improvements in related fields including improvements to text compression, character recognition, language translation, and other areas as described below.

Additional objects of the invention are further described below.

These and other objects are achieved by what is described herein by data input and data output portions of the present invention. In particular, for the data input portion of the invention, various embodiments of the present invention comprise a keyboard or a phone keypad, having the ability to predictively display different word images in association with its various keys, within a variety of predefined sets of word images, based upon either the character preceding an insertion point entered in a corresponding text field on a display, the last key image entered from the keyboard or the last word image chosen. For purposes of this description, we will use "word" to also include phrases. Although each word image is capable of displaying numerous different words, each word image location represents only one word image at a time and each word is displayed at only one word image location. The user can also manually change the way that the word image locations are arranged and the sorting methodology for representation in the word image locations. When a user selects a particular key or selects an insertion point within the text field, all word images are updated to display a word that corresponds to the set of words from which the user would be most likely to select a word from next, based upon the frequency of the particular character combination or word selected being used in either a particular language or application. The organization of the words within each word set layout is also based on the frequency of those words being used in either a particular language or application. The keyboard or phone keypad can be implemented to operate as either a touch-sensitive display or as a collection of interactive images on any of a number of different displays. The keyboard or phone keypad can also be used in conjunction with the special function keys or buttons that are common to computer systems or phones for performing function-character command operations, or the keyboard can be modified to allow for ease of selecting the word keys. This same frequency-based predictive analysis can also be used to improve recognition of scanned items or transcription or spellchecking based upon an analysis of the words before or after any word that cannot be recognized, and the space or time between words.

For the data output portion of the invention, embodiments of the present invention comprise a frequency-based list of words, phrases and alphanumeric strings that can be used to code information to a combination of numeric or alphanumeric proxies that take up substantially less space. As these proxies can be reconstituted by reversing the process, it can be used to reduce data storage and transmission by 50% or more. In addition, as these words and phrases can be combined into groupings that have clear meanings, the combined proxies can be used to improve translation by using the multi-proxy phrase as a master key similar to a Rosetta Stone. Another embodiment of this compression is to improve the usefulness of bar and matrix codes (such as QR-codes and Data Matrix codes) by including the information compression codes in the program that reads the bar and matrix codes allowing for substantially more data to be contained.

In accordance with a particular embodiment of the present invention, a method is provided for improving data input in a system having an input device, a display device and a processor operatively coupled to the input device and the display device, wherein the method comprises: ascertaining, by the processor, a set of words for display to a user of the system based on an already displayed word by the display device immediately preceding a text insertion point, each of the words in the set being ascertained based on a respective frequency of usage of the respective word with the already displayed word in a predetermined language; displaying, by the display device, each word in the ascertained set in association with a respective selectable dynamic key; receiving, by the input device, an input data entry representing selection by the user of one of the selectable dynamic keys; and displaying, by the display device, at the text insertion point the respective word in the ascertained set associated with the selected dynamic key as represented by the received input data entry.

In accordance with another particular embodiment of the present invention, a system is provided for improving data input, comprising: a display device for displaying one or more words to a user of the system, the display device including a text insertion point; an input device operative to receive an input by the user and to produce an input data entry identifying the user input; and a processor operatively coupled to the display device and the input device, and programmed to: ascertain a set of words for display to a user based on an already displayed word by the display device immediately preceding the text insertion point, each of the words in the set being ascertained based on a respective frequency of usage of the respective word with the already displayed word in a predetermined language; controlling the display device to display each word in the ascertained set in association with a respective selectable dynamic key; receive from the input device an input data entry representing selection by the user of one of the selectable dynamic keys; and controlling the display device to display at the text insertion point the respective word in the ascertained set associated with the selected dynamic key as represented by the received input data entry.

For the above-summarized methods and systems embodiments of the present invention, various features and aspects are summarized below.

As an aspect of the present invention, the input device receives another input data entry representing selection by the user of a character in the language; and the processor ascertains a set of words associated with the character represented by the received another input data entry; and wherein the receiving and second displaying steps (and corresponding elements in the system) are implemented after ascertaining, by the processor, the set of words associated with the character represented by the received another input data entry.

As a feature of this aspect, words associated with a character correspond to a frequency of usage in the language of words beginning with the character.

As a further feature of this aspect, the input device receives input from the user representing a plurality of characters in the language.

As another aspect of the present invention, the already displayed word is displayed in a text display portion of the display device, and the ascertained set of words are displayed in a word set display portion of the display device.

As a further aspect of the present invention, the ascertained set of words are displayed at fixed locations by the display device, whereby word locations associated with each of the words in the set that are displayed are learned by the user in such a manner so as to facilitate more rapid entry by the user using the input device.

As an additional aspect of the present invention, the ascertained set of words includes eight or nine words, and the display device displays the nine words of the set in a 4×2 or 3×3 table.

As yet another aspect of the present invention, upon displaying the selected word in the displayed ascertained set, another set of words is ascertained based on the word just displayed by the display device.

As yet a further aspect of the present invention, the set of words are ascertained based on a frequency of usage of each of the words in the set with a plurality of words displayed by the display device immediately preceding the text insertion point.

As yet another aspect of the present invention, the set of words are ascertained based on a frequency of usage of each of the words in the set with a plurality of words displayed by the display device immediately preceding the text insertion point and also based upon an analysis of grammar and usage rules.

As yet an additional aspect of the present invention, multiple sets of words are stored in a memory, each of the stored sets of words identifying words having a relatively high frequency of usage with a respective associated word in the language; and the ascertained set of words associated with the already displayed word is retrieved from the memory.

Still as yet another aspect of the present invention, a current, updated frequency of usage of word combinations is obtained; and ascertaining the set of words is carried out based on the current, updated frequency of usage of word combinations.

As another aspect of the present invention, the frequency of usage of words with the already displayed word is based upon frequency of usage by a general public.

As a further aspect of the present invention, the frequency of usage of words with the already displayed word is based on frequency of usage by the general public in combination with frequency of usage by the user of the system.

As an additional aspect of the present invention, the frequency of usage of words is based on frequency of usage by a plurality of users.

As yet another aspect of the present invention, the frequency of usage of words with the already displayed word is based on a demographic of the user.

As yet a further aspect of the present invention, the frequency of usage of words with the already displayed word is based on a frequency of usage statistics pertaining to a current geographic location of the user.

As yet an additional aspect of the present invention, the user of the system is enabled to change the text insertion point, and the ascertained set of words for display to the user is based on a displayed word or words immediately preceding the changed text insertion point.

As a further aspect of the present invention, the display device displays a set of functional icons corresponding to different actions to be taken by the system upon subsequent selection by the user.

As a feature of this aspect, one of the functional icons in the set corresponds to an action for changing each of the words in a prior displayed set from lower case to upper case or title case.

As another feature of this aspect, one of the functional icons in the set corresponds to deleting an identified word or words displayed by the display device.

As a further feature of this aspect, one of the functional icons in the set corresponds to displaying a user-predefined set of words in association with the selectable dynamic keys with the user optionally given the choice of how many keys are entered before the user-predefined words appear.

As an additional feature of this aspect, one of the functional icons in the set corresponds to displaying a user-predefined set of phrases, each of the phrases associated with a respective selectable dynamic key with the user given the choice of how many keys are entered before the user-predefined phrases appear.

As yet an additional feature, upon double tapping the space bar, a period is displayed along with the functional icons in the set correspond to the most common punctuation that a user might require. Upon selecting one of these functional icons, the period is replaced by the selected functional icon.

As yet a further feature of this aspect, one of the functional icons in the set corresponds to an action for causing the display device to display synonyms of the word at the text insertion point.

As yet another feature of this aspect, one of the functional icons in the set corresponds to an action for causing the display device to modify the words in the displayed set by adding adjectives, changing lemmas, or other modifications to the word.

As yet an additional feature of this aspect, one of the functional icons in the set corresponds to an action for causing the display device to display a set of data from an address book of the user as stored by the system, the set of data displayed in association with the selectable dynamic keys.

As yet a further feature, one of the functional icons in the set corresponds to an action for causing the display device to display a set of words in association with the selectable dynamic keys, wherein the displayed set of words are based on a respective frequency of usage of the respective word and integrating data from an address book of the user as stored by the system as well as user-defined words and phrases into the set.

As another aspect of the present invention, the system (and the system implementing the method) is a portable cellular device having an input device having at least keypad elements labeled 1 through 9, wherein selection by the user of one of the keypad elements labeled 1 through 9 represents selection of a respective one of the selectable dynamic keys displayed by the display device.

As a feature of this aspect, the input device of the portable cellular device includes a set of additional selectable elements to enable the user to select a letter using the keypad elements normally representing a number or two or more letters.

As a further feature of this aspect, the input device of the portable cellular device includes a rocker button having multiple (e.g. four) positions to enable the user to select one of at least four identified choices using one of the keypad elements normally representing a number or two or more letters.

As another feature, the words are ascertained based on a T9 predictive text methodology that uses the frequency of the words that could be created based upon any letters that appear on a selected key of a 9-key keypad to populate the word keys, or in the case of phones that use two letters in each button, the frequency of words that can be created from either letter of that key.

As yet another aspect of the present invention, the display device and the input device are incorporated within a touch-sensitive display.

As a feature of this aspect, the input device is operative to display within the touch-sensitive display each of the letters of the language as a separate input element in a circular format and the set of words are displayed as the selectable dynamic keys within the circular format of the displayed input elements.

As a further feature, the input device is operative to display within the touch-sensitive display each of the letters of the language as a separate input element in three rows, consonant letters of the language disposed in upper and lower rows and vowel letters of the language disposed in a middle row between the upper and lower rows. In addition, the user can drag a finger over the letters to form words until the words appear in the word buttons, and double letters can be entered by circling the letter when dragging.

As a further aspect of the present invention, the input device includes first and second input devices, the first input device and the display device disposed on a front of the portable cellular device, and the second input device disposed on a back of the portable cellular device, the second input device including selectable buttons for selecting the selectable dynamic keys associated with the displayed set of words.

As a feature of this aspect, the set of words includes nine words displayed in a table having three rows and three columns by the display device, and the second input device includes three buttons disposed on a left portion on the back of the portable cellular device for selecting each of the three words displayed in a left-most column of the table, and the second input device includes three buttons disposed on a right portion on the back of the portable cellular device for selecting each of the three words displayed in a right-most column of the table, and wherein simultaneous depression of respective left and right buttons on the back of the portable cellular device selects each of the three words displayed in a middle column of the table.

As a further aspect of the present invention, the system is a portable cellular device, and the input device includes a depressable button on the side, wherein depressing the side button causes a function of a key representing a letter or number to become a function for selecting at least one of the selectable dynamic keys.

As another aspect of the present invention, the device includes a dual pressure key that, upon depression beyond a predetermined location, changes a function of another key representing a letter or number to a function for selecting the selectable dynamic keys.

As yet an additional aspect of the present invention, the displayed set of word keys or functional icons corresponding to different actions to be taken by the system are color coded to match and represent physical buttons either on a keyboard or cellular keypad.

As yet another aspect of the present invention, double tapping on a space bar causes a period key (or other character) to be displayed at the text insertion point and a set of selectable dynamic keys are displayed that show the most common punctuation that the user might choose including a way to enter bullets or a new paragraph, and the selected punctuation replaces the displayed period (or other displayed character).

As yet a further aspect of the present invention, word keys are displayed on a computer monitor and one of the displayed word keys may be selected by an attached mouse or portable device.

As yet an additional aspect of the present invention, if a non-text entry immediately precedes the text insertion point, a set of words are displayed that are based upon the most likely starting words that follow that non-text entry immediately preceding the text insertion point, or, if there is no text preceding the text insertion point, a set of words are displayed based upon the most common words used to begin a document.

Summaries of additional aspects and features continue as follows.

The system can have the ability to delete a word by activating an accelerometer in the unit by movement of the device or by swiping a finger over the text while the word is selected. The system can have the ability to change a word to a synonym by activating a word key that can display synonyms in the word keys. The system can have the ability to change a word to additional tenses for verbs, change plural to singular and vice versa for nouns and change adjectives and adverbs between its standard and comparative and superlative forms. The system can have the ability to display a punctuation selection in the word keys by double tapping the space bar including the ability to add paragraph marks and bullets. The system can have the ability to select a more complex word by holding a word button for a longer period of time and inserting the word without a follow-on space and allowing a longer word to be built more easily.

The system can have the ability to display information in landscape mode on a portable device with the word buttons shifted to either the left hand side or right hand side depending upon which direction the device is turned.

Feedback data may be stored and utilized based on words selected by the user and sent to a central location, where the sent information is combined with data from users of other like and similar devices in order to refine the statistical predictions. The frequency of use of each letter can determine the order that a key in a phone keypad is displayed for use in text based data entry. The system can have the ability to allow the user to download additional data as well as upload user-generated frequency data.

The system can have the ability to allow the user to be given a chance to randomly get a benefit to entice the user to send the user's information to a receiving device, such as a central location.

The statistic data initially is predefined and can be modified after use of the device by the user based upon the user's specific word usage. The keys or word keys may be color-coded based upon frequency to make it faster for the user to find a desired key or word key or to make it clearer in the case of a 9-key handset that the word key represents one of the 9 buttons in the handset.

The numeric keypad can be used to represent the word keys for use in computer-based systems (e.g., desktop computers).

In another embodiment of the invention, a system/method of compressing data includes comparing each word to the master frequency template and replacing each word with the combination of characters and word key numbers until the word can be uniquely identified; and replacing the words with the unique identifier that represents the given word.

Frequency data may be based upon specialized phrases that occur in high frequency that represent the characters, words and phrases used in various applications.

In a further embodiment of the invention, a system/method of transmitting data from a keyboard for entering text on a display includes recording the word key and keystroke selections that a user makes; replacing each word with the frequency code that would represent the given word; transmitting the compressed text information; testing to see if the recipient is using the same system; and restoring the message before transmission if the user is not using the system or sending the compressed data if they are part of the same service.

In a further embodiment of the invention, a system/method of improving optical character recognition of scanned data includes comparing each word to the frequency-based data including based upon prior words and grammatical rules and suggesting a replacement or replacing any word that appears incorrect due to typographical errors, entry errors in the original document or missing or unclear data; and suggesting a replacement or replacing the incorrect or missing word with the most likely word or phrase. Unknown words can be substituted with the most likely suggestion and the user can review these choices. By showing the user the most likely 9 replacements in a way that each replacement can be substituted by clicking one word key, the efficiency of the OCR process can be meaningfully improved.

In another embodiment of the invention, a system/method of improving spell checking of typed data during or after typing includes comparing each word to the frequency-based data including based upon the prior words and grammatical rules, and suggesting a replacement or replacing any word that appears incorrect due to typographical errors or entry errors in the original document; suggesting a replacement or replacing the incorrect or missing word with the most likely frequency-based word or phrase. By showing the user the most likely 9 replacements in a way that each replacement can be substituted by clicking one word key, the efficiency of spellchecking can be meaningfully improved.

In yet another embodiment of the invention, a system/method of translating data from one language to another includes translating the words of a document into proxy words that relate to a list of words; replacing the words with the word keys that would represent the given word; combining the word keys into word phrases that can represent a phrase that has a meaning; translating similar phrases in other languages into word keys and creating proxy words and phrases; using one language as the master language and combining words and phrases from one language to another using this language as a key.

In yet a further embodiment of the invention, a system/method of expanding the content of bar and matrix codes by using a compression algorithm includes comparing each word to the master frequency template and replacing each word with the combination of characters and word key numbers until the word can be uniquely identified or embedding the entire word, phrase or alphanumeric content in the master list, replacing the words with the unique identifier that represents the given word, phrase or alphanumeric content, providing users with a reader program that has the decoding key. Also, the word, phrase or alphanumeric content is created using an algorithm made up of words and phrases already contained in the master list.

In yet an additional embodiment of the invention, a system/method of sending data in a form less likely to be altered includes sending as a screenshot picture especially on a background that has part of the background in the same color as the text with or without an encrypted security code, making it difficult to separate the text from the background in many photo altering software and making mobile communication more secure.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 13a and 13b are various illustrations useful for explaining various benefits of the present invention.

DETAILED DESCRIPTION OF THE PRESENT INVENTION

Dynamic frequency-based technology as herein disclosed has a multitude of uses in connection with both the input and output of data in multiple languages. One of the primary input modalities, a dynamic frequency-based keyboard, as used in combination with a handheld display device, and for use in such devices as computers, appointment books, inventory recorders, telephones and the like, is herein disclosed.

Figure 1:
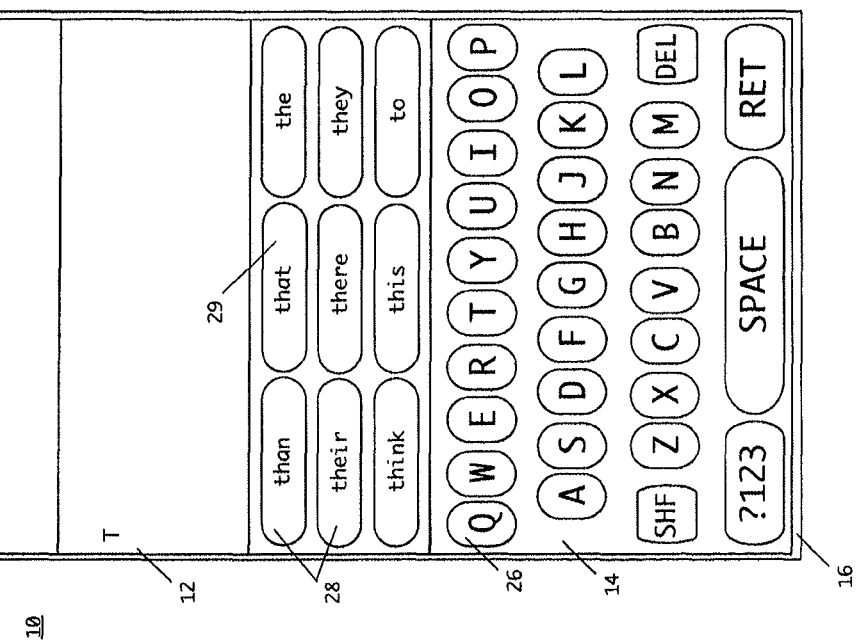
FIG. 1 is a schematic illustration of a dynamic predictive keyboard, in combination with a hand-held display device, illustrating a word image locations and a blank text display screen, in accordance with certain embodiments of the present invention.

As used herein, the term "keyboard" shall broadly include standard-sized keyboards, non-standard keyboards, keypads, touchpads, scroll wheels or balls, and other devices that receive inputs via depression by a user's finger, hand, stylus or other mechanical device, including touch-sensitive screens and multi-touch inputs/displays. The keyboard and the display device, generally shown as 10, are illustrated in FIG. 1. The display device is comprised of a text display screen 12, a character set display screen 14, and various well-known electrical components required to operate those displays contained within the housing 16. The keyboard of the present invention is displayed within the character set display screen 14 and includes a number of dynamic word key locations 28 which can be variously controlled by the display device 10 to display different word images or characters within the display screen space allocated to each word key 29. For example, as shown in FIG. 1, word key 29 has been set to display the English word "that". The keyboard and display device 10 further optionally include a set of buttons 13 on its back (or rear) side, or a touch sensitive surface, as will be further described.

Figure 2:
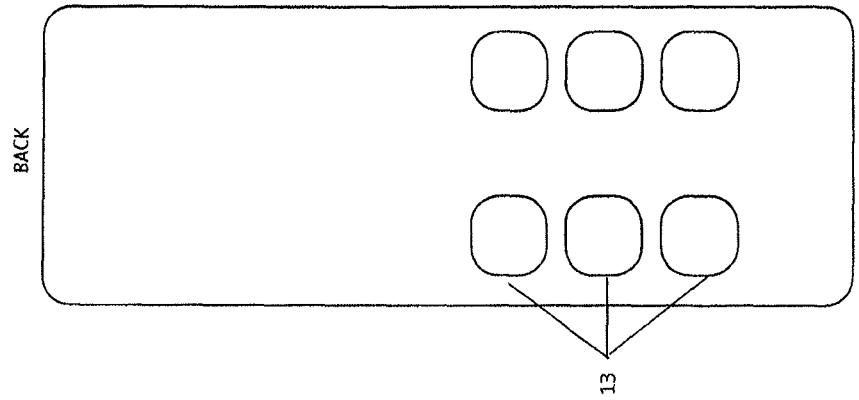
FIG. 2 is a schematic illustration of a dynamic predictive keyboard, in combination with a cellular handset device, illustrating a word image locations and a blank text display screen, in accordance with certain embodiments of the present invention.
Figure 2:
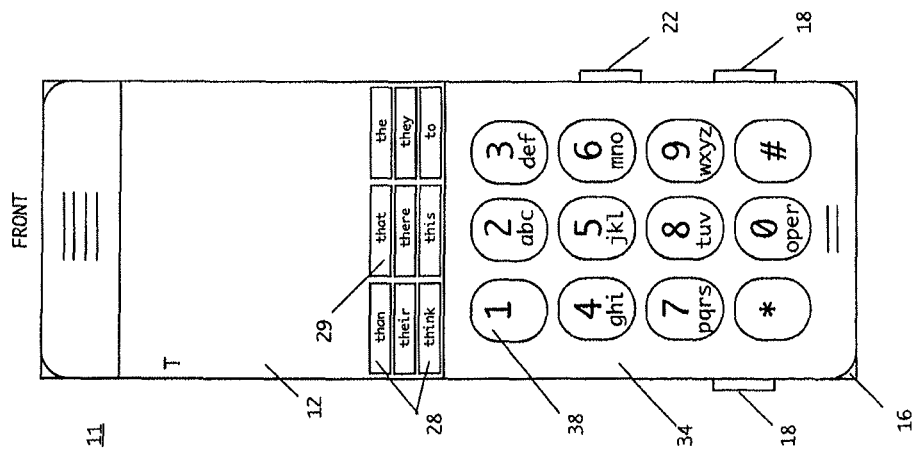

In the cellular handset embodiment, generally shown as 11, is illustrated in FIG. 2. The display device is comprised of a text display screen 12, and various well-known electrical components required to operate those displays contained within the housing 16. Also connected to the housing 16 may be shift buttons 18, on either side of the housing and an option button 22, as well as a set of buttons 13 on the back of the device. The word images of the present invention is displayed within the display 12 and includes a number of word key locations 28 which can be controlled by the keypad buttons 38 located in a keypad area 34 to display different word images or characters within the display screen space allocated to each word key 28. For example, as shown in FIG. 2, word key 29 has been set to display the English word "that".

It should be noted that although the keyboard and display device 10 are shown as an integrated handheld, touch sensitive unit throughout this description, a keyboard having the basic elements of the present invention could also be displayed on any standard type of display, such as an LCD, or incorporated into any environment where it is possible to dynamically provide a method of changing the layout corresponding to the word keys. Although a separate display area should typically be reserved for the keyboard, the keyboard could be shown in the same area as the text when necessary or a handwriting recognition system used which could eliminate the need for a keyboard. When the keyboard is utilized on the screen of a standard display using replicas of the keys and/or interactive software-based images, the word keys and buttons can be activated by a pointing device, or cursor control device, such as a mouse or by a keyboard that can be modified through hardware or software to enable the keys to be used to select the word keys or by using a handwriting recognition system that detects a finger or stylus. For example, option button image 20 could be selected by simply positioning the cursor over the button and depressing the selection button of the mouse to select the control function. Alternatively, a set of hardware word key switches could also be used. In one embodiment, individual display elements would be positioned within or near each switch for displaying the different word key images. In a second embodiment, the switches would be left blank, but the hardware keyboard would be operated in association with a display upon which replicas of the word keys and the various key images could be projected. In another embodiment, the keyboard can be chorded to allow for multiple keys held down to distinguish between the key being used for a letter or a word or the keypress can have multiple effects depending upon the amount of pressure exerted on the key. In another embodiment, a touch sensitive surface could be added to the keys to give them this ability to act in more than one way.

Figure 3:
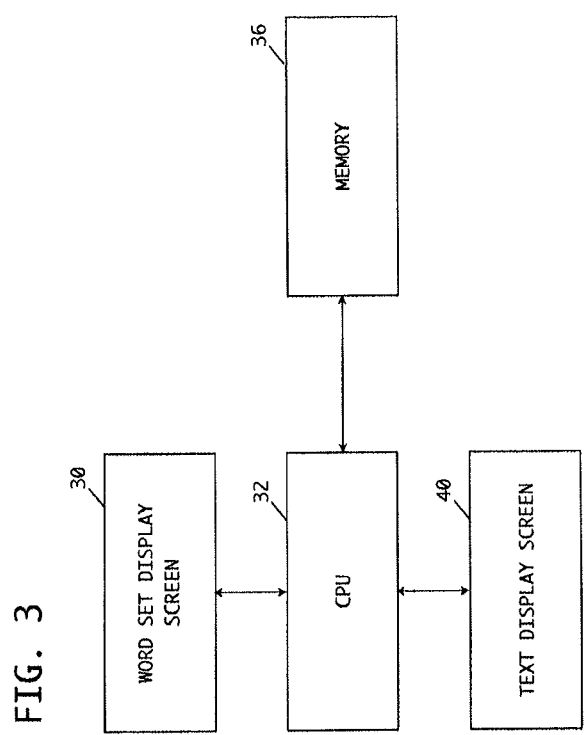
FIG. 3 is a block diagram of a computer system for use with the dynamic predictive keyboard of the present invention.

Regardless of the manner in which the present invention is implemented, the basic operation of the keyboard system and the software and electronics, which allow it to operate, can be described with reference to the block diagram of FIG. 3. The word set display screen 30 displays sets of the word key images that were selected to be displayed by the central processing unit (CPU or processor) 32 and acts as an interface between the user and the keyboard system. In one embodiment, the display device screens 30 and 40 are composed of touch sensitive overlay screens in combination with display units, the operations of which are well known to persons of ordinary skill in the computer arts. When a user selects a particular word key or button from the character set display screen 30 or selects an insertion point from within the text field of the text display screen 40, a select signal corresponding to the selected word, function key or button, or the characters preceding the insertion point, is output to the CPU 32 for processing. If the user selected a particular word to be displayed or a particular insertion point, the CPU 32 would analyze the select signal, determine (predict) the next word to be displayed based upon that select signal (layouts are stored in memory 36), display the next word in the word set display screen 30, and display the word corresponding to the select signal in the text display screen 40. Word definitions and word set layouts are drawn from memory 36 when appropriate. As previously stated, the designations for display screen 30 and display screen 40 could easily correspond to the same display screen if desired.

With reference now to FIG. 1, a sample representation of the different word set layouts $D_{TABLEID}$ as an example of the over 100,000 or more word set layouts that get created by the statistical analysis, which are shown as they would be displayed within the word set display screen 28 in accordance with the present invention, are shown. The variable TABLEID represents the last characters entered or any word selected by the user or a code representing the "main menu". So if the user typed the key "T" then TABLEID would be T and $D_T$ would represent the word list that would be generated by the user entering a single character "t". As explained above with reference to the prior art, the standard English language keyboard for typing is the QWERTY keyboard. The QWERTY keyboard has a total of forty nine keys, including Shift and Return (or Enter) character keys, but not including Tab, Caps Lock, or Delete character keys, and not including any of the other character keys which are commonly used on computer keyboards, such as Control, Option, Function 1 through 15, etc. These forty nine keys, together with the shift key, allow users to type all 26 letters of the English language, in both upper and lower case, the 10 digits of our standard numbering system, the 32 punctuation marks and symbols most commonly used in English, and Space, Backspace, Return, and Tab.

An object of the present invention is to reduce the number of keystrokes required to enter data on a keyboard, reduce typographical errors and allow for more efficient storage and transmission. The present invention meets this objective by providing a keyboard having a minimal number of keystrokes by using predictive word analysis and providing the user with a complete word which by definition has no typographical errors. In the present invention, unlike a standard fixed keyboard, some if not all of the keys are dynamic, in that they have the ability to display different words while the keyboard is in use. Hence, each word key may represent several words, letters, digits, or symbols. Although different arrangement are quite possible, each word key typically only represents a single word at a time and each word is typically only displayed at one word key location. In addition, the user has the ability to manually cause the set of characters being displayed to change, such as by selecting specially identified buttons, which may be fixed buttons further described below, or to predictively change the word set layout by simply selecting a word to be typed or by entering user-defined words or phrases that can be integrated into the word keys.

When a user selects a word key, all of the word keys are updated to display the set of words that would most likely be used next by the user. The choice of what word to display next is based on the frequency of word combinations typically used in the language, or can be user defined or determined by the particular application with which the keyboard is being used. For example, one particular word set layout is displayed after the user types a letter or combination of letters based on exactly which letter was typed last, which would yield some 85,000 or more word set layouts. Another is displayed after the user types a word, yielding a different layout based upon which word was chosen as well as prior words chosen. The order of these layouts can either be based on statistics relating to the particular language being used, which is further explained below, based upon user selection, or on specific applications running on the particular machine with which the keyboard is being used. In addition, a space can be added along with the word further reducing keystrokes.

By typically displaying each word at only one word key location, a user can gradually learn where each of the words should appear, thereby aiding in the development of more rapid typing with the keyboard. This is also true because each specific sequence of words always has the same sequence of keystrokes. For example, the phrase "in the way" may always be typed "i<in ><the><way>" by pressing the letter "i" on the keyboard which causes the word keys to be shown. The user then selects the word key "in" after which the user is shown the predictive word key "the" and the predictive word key "way" allowing the user to enter the phrase in only four keystrokes and with virtually no chance of making a typographical error. This allows the user to consciously or subconsciously learn to type sequences of words, as touch typists do with letters.

Figure 4A:
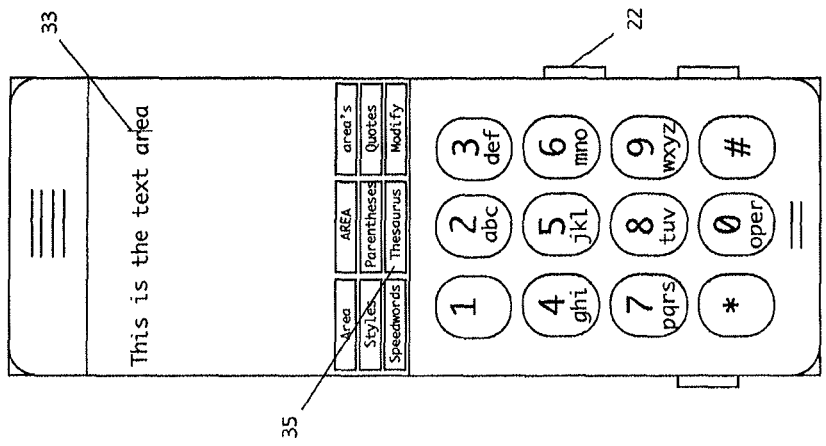
FIGS. 4a-4d are schematic illustrations of the different word set layouts which can be displayed in accordance with certain embodiments of the present invention.
Figure 4A:
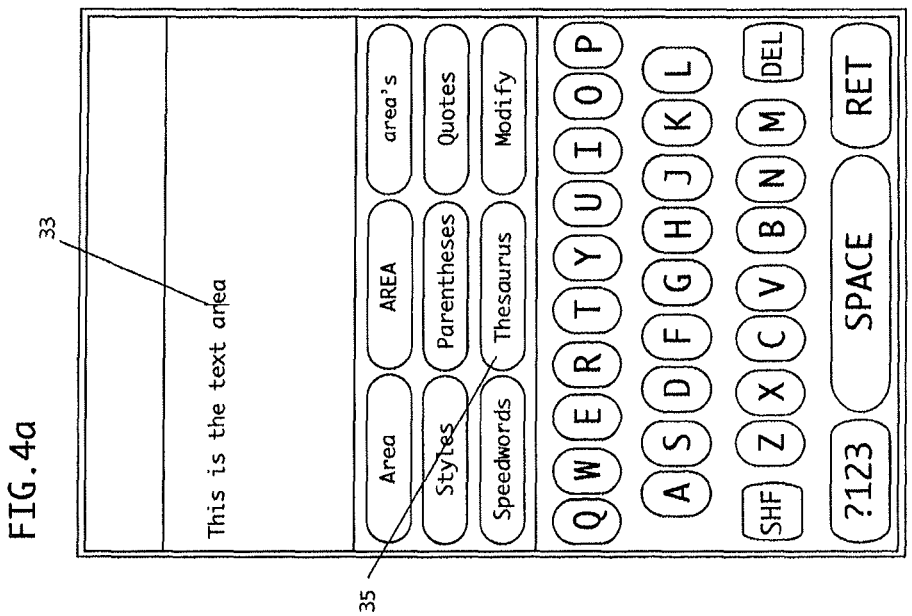

When the user selects a word in the text already entered, e.g., the word "area" 33 shown in FIG. 4*a*, the predictive word keys in a word key area 31 change. In the example, the user knows that the thesaurus, modify menu and other commands would not automatically appear when words were typed, so that user selected the text that was typed to manually cause a word set layout having the menu words appear which includes "thesaurus" and "modify".

Figure 4B:
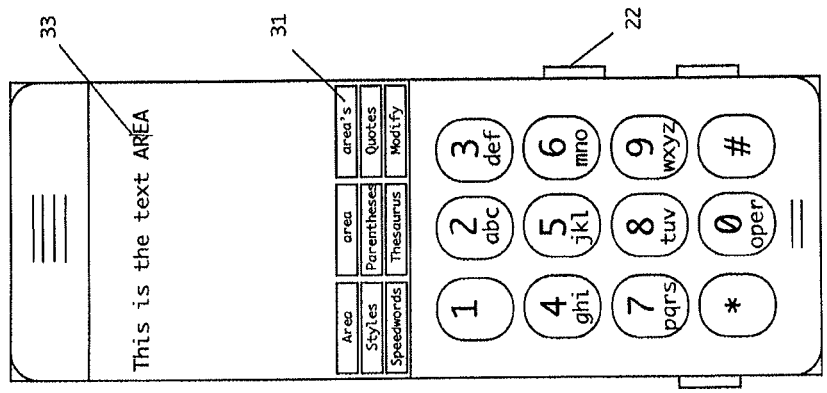
Figure 4B:
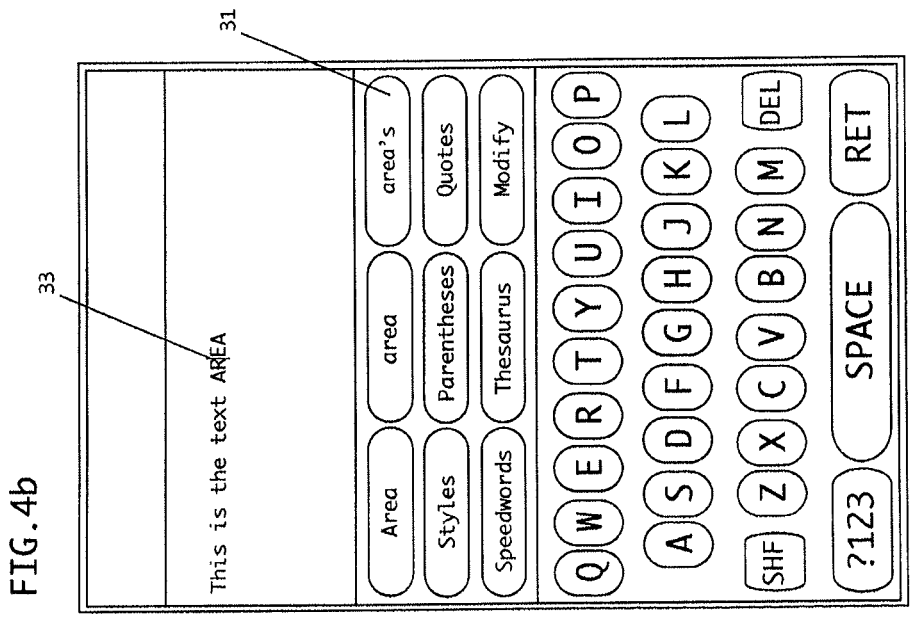
Figure 4C:
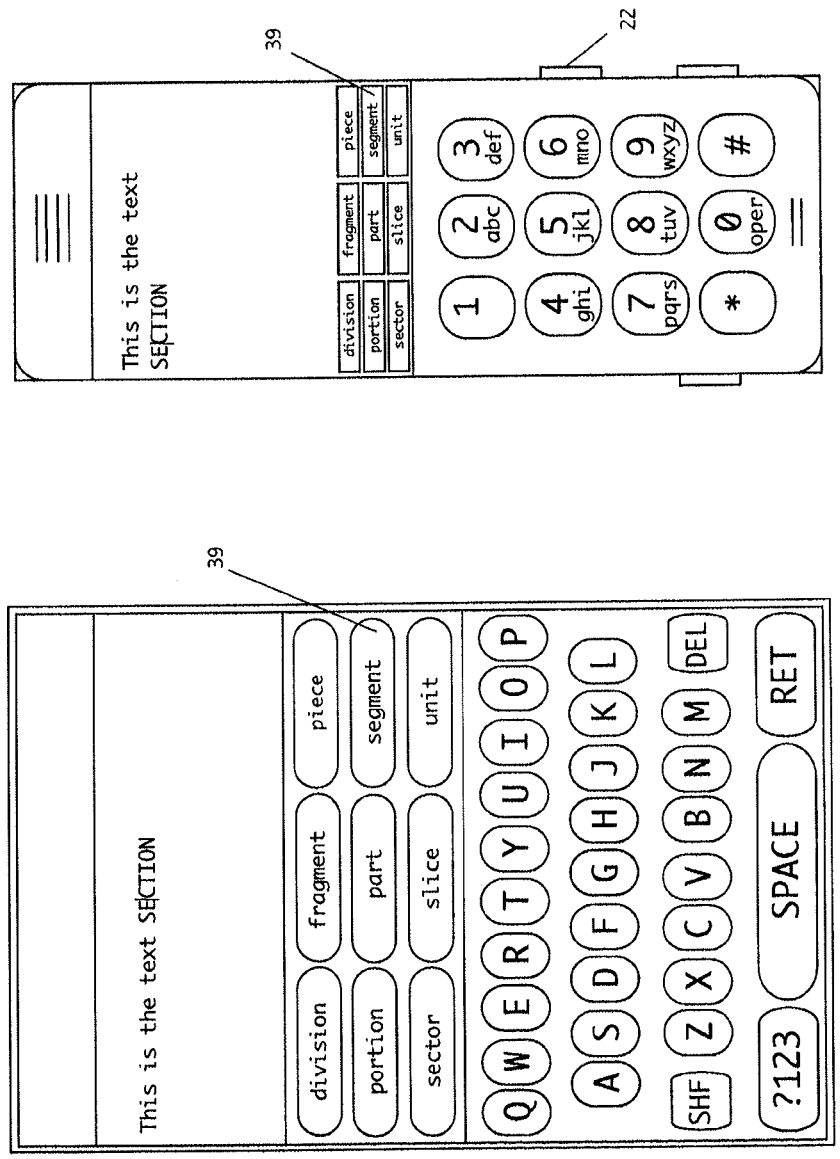
Figure 4D:
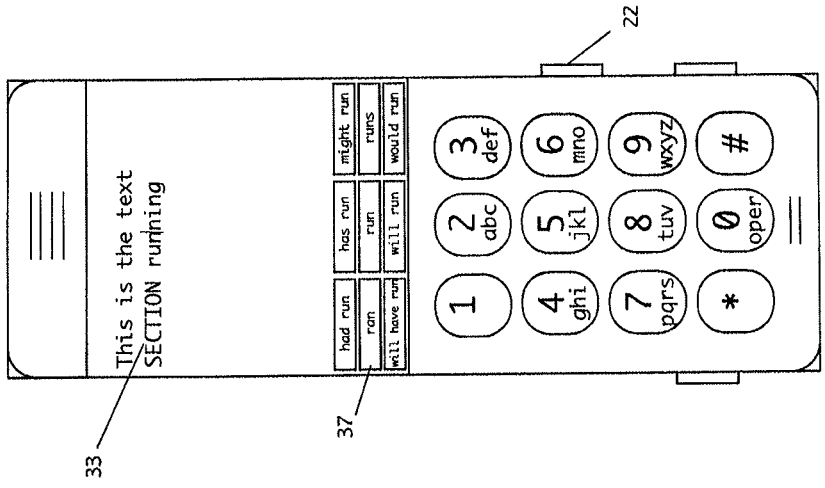
Figure 4D:
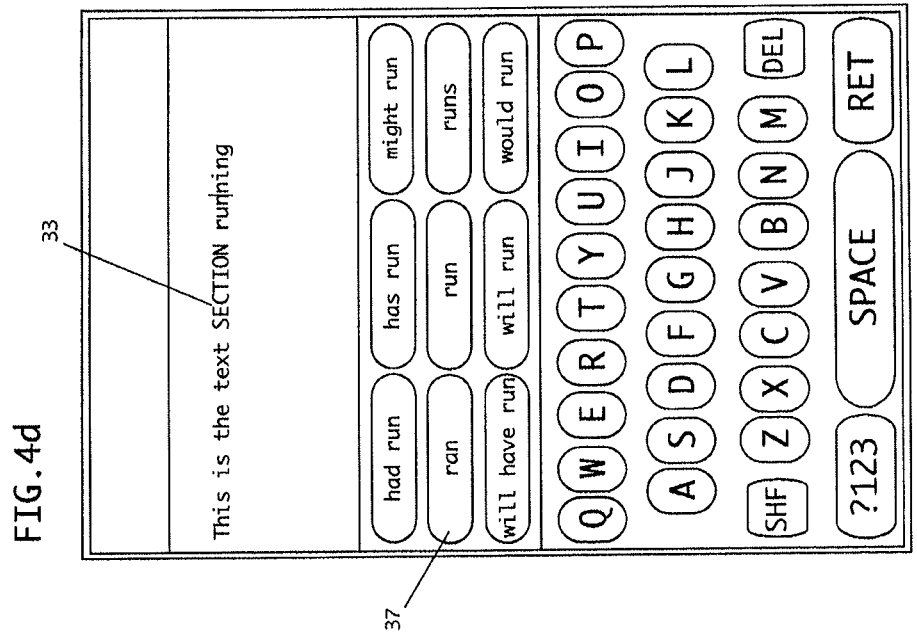

By selecting the word key "thesaurus" 35 shown in FIG. 4*a* the word keys dynamically change to show the most likely synonyms in a synonym area 39 for the word selected shown in FIG. 4*c*. If the word has multiple meanings based upon more than one part of speech, the user can be given the ability to choose which meaning was requested, or additional logic can make the determination based upon context. Another word key is "modify" which causes the word keys to modify the selected word e.g., by changing tenses as shown in FIG. 4*d* or by adding the most common adjectives to the word selected.

The layout of the character sets and organization of the layouts of the present invention were determined using a statistical analysis. The purpose of this analysis was to calculate the frequency of various word combinations in the English language so as to derive word set layouts that would represent the most likely words to be used. A database of standard text was analyzed to determine which words were most commonly used amongst all of the words of a language. The most commonly occurring words were then analyzed using the same database to determine which words were most likely to follow a particular word. This same analysis format was then repeatedly used to determine the most common words following different sets of characters, of two, three, four, five, six, seven and so on letters until the word sets $D_A$ through $D_{Z\#\#\#\#\#\#\#\#\#}$ were derived. Through careful selection of the word sets to display after each keystroke, or word selected, the number of keystrokes to produce a desired word can be kept low. For example, out of a sample of 63,000 words, it was determined that a weighted average of only 1.95 keystrokes, are required to enter the text using the word set layouts. Hence, for typical English text or numeric input, fewer than 2.0 keystrokes are required per word typed. In addition, if a standard statistical lookup table is used, the data entered can be similarly compressed and stored or transmitted in this more efficient form to another user or third party, in effect using the statistical analysis as a compression algorithm to more efficiently send data.

This same analysis can equally be applied to different languages, different usages within a particular language, or other particular applications, so as to derive word set layouts which provide the greatest efficiency (the least number of keystrokes per word). Hence, because the type of text being typed may cause the most commonly required words to change, the character set layouts, of which FIG. 1 is an example, is only presently believed to be the best mode of practicing the present invention with respect to the English language as used at this time. It is impossible to say whether these character set layouts represent the optimum arrangement of characters possible in every instance or will continue to do so in the future. The analysis can also be used in applications such as selecting pictures using words, e.g. to bring up sign language quickly to communicate with the deaf, or for graphic applications. Alternatively, if a music corpus is entered, the dynamic word keys could represent notes, chords and rests for music applications.

The composition and order of word set layouts may be selected in many different manners. Some users may wish to establish word set layouts in their own particular fashion, while others may wish to simply use an initial default layout which can be subsequently modified according to various feedback data relating to previously selected word key images, or actions performed by the keyboard or controlled device as a result of word key image selections. For example, a processor performing the predictive operations of the keyboard could be programmed to suggest different word set layouts after a user had used the keyboard while set in a default mode over a first period or from data gathered from a multitude of users.

Returning now to the actual composition of the layouts using example $D_T$, it should be noted that layouts correspond to all of the characters from the keyboard and that layouts $D_A$ to $D_{A\#\#\#\#\#\#\#\#}$ which match the character set layouts of a group of 2, 3, 4, 5, 6, 7, 8 or 9 characters. The word set layouts are displayed within the word set display screen 14 so that layout $D_A$ to $D_Z$ is the default layout for each single letter key typed, which would provide 26 layouts for the letters in the English language along with layouts for numbers and special characters. The basic rules for determining which of the word set layouts are to be displayed after a keystroke are as follows:

(1) After the user types any letter, number or special punctuation key, then word set layout $D_{TABLEID}$ is to be displayed which allows the user to select a word key.

(2) If the appropriate word key is not visible, the user can type any remaining characters, and the TABLEID variable gets the next character added to it and a new word set layout $D_{TABLEID}$ is displayed.

Additional rules, which will be explained below, apply after the user selects a word that has already been entered 58, or selects a functional menu key such as the thesaurus key 35.

With reference now to FIGS. 5 through 9, the operation of the keyboard in association with the display device 10, or any dynamic predictive keyboard, is described. FIG. 5*a* illustrates a first portion of a method for implementing the dynamic predictive keyboard in accordance with one of the embodiments of the present invention, and in particular with respect to a method for handling select signals corresponding to functional menus representing word keys and in FIG. 5*b*, the case of the cellular handset, option keys as an example of a means to enable the keypad buttons to also control the menu keys.

Figure 5A:
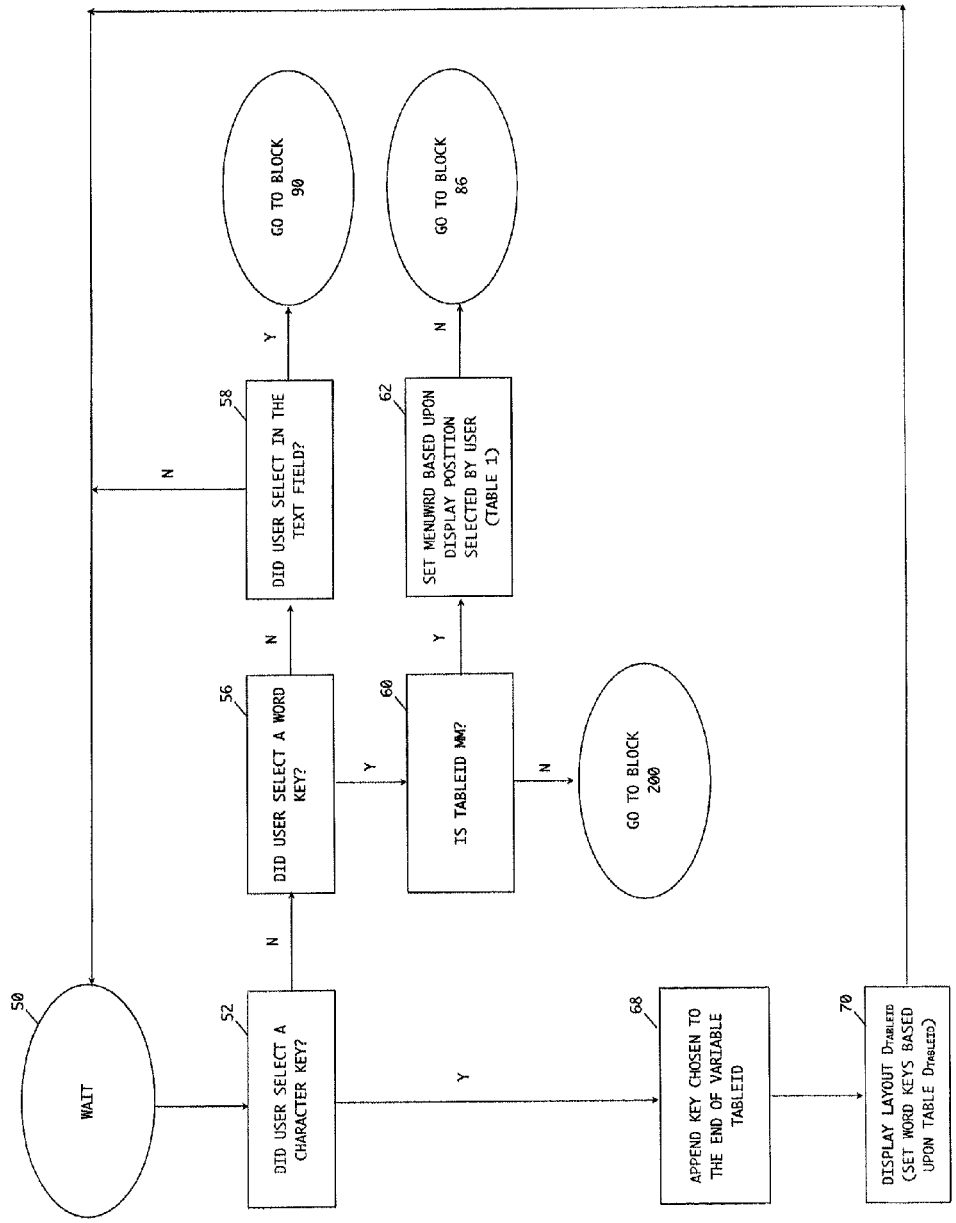
FIGS. 5a, 5b, 6, 7, 8, 9, 10a and 10b are schematic illustrations useful in explaining certain methods for implementing the dynamic predictive keyboard of the present invention.

When the display device 10 from FIG. 1 is activated, the electronics system associated with the device, as generally described in FIG. 5*a*, initially starts off by waiting, block 50, for the user to either select a character key 26 or select an insertion point within the text field of the text display screen. Upon receiving a select signal, the system first asks whether that signal was generated as a result of the user selecting one of the keys 26 or one of the menu keys 28 from within the display screen 30, block 52. If the user selected a menu key, the row and column of the display corresponding to that key, and therefore its corresponding character or functional menu, are reported to the CPU as the select signal. The CPU then sets a variable named "WRD" based on the reported display position selected by the user, block 204. The value assigned to the WRD variable corresponds to a position within a look-up table stored in memory 36 containing data for creating images on the text display corresponding to selected characters. A look-up table in accordance with the present invention, corresponding to a keyboard having a maximum of three rows and three columns of word keys, and corresponding to the word set display screens illustrated in FIG. 1, is shown below in Table 1, with corresponding rows from the display running from top to bottom and corresponding columns from the display running from left to right. As there are hundreds of thousands of word key sets in the statistical analysis, the data shown in Table 1 represents only a sample of the necessary data.

TABLE 1

|  |  | ROW | | | | | | | | |
|---|---|---|---|---|---|---|---|---|---|---|
|  |  | 1 | 1 | 1 | 2 | 2 | 2 | 3 | 3 | 3 |
|  |  | | | | | COL | | | | |
|  |  | 1 | 2 | 3 | 1 | 2 | 3 | 1 | 2 | 3 |
| SAMPLE | $D_A$ | and | a | are | at | an | as | about | all | also |
| WORD | $D_B$ | be | but | by | been | because | back | between | being | big |
| SETS | $D_C$ | can | could | children | came | city | country | can't | case | company |
|  | $D_T$ | the | to | that | this | they | their | there | them | time |
|  | $D_{TH}$ | the | that | this | they | their | they | them | than | then |
|  | $D_{MM}$ | Upper Case | Sentence Case | Possessive | Styles | Parentheses | Quotes | Speedwords | Thesaurus | Modify |

If the user selects a character key, as determined in block 52, the selected key is appended to the end of TableID variable in block 68. Then, in block 70, word keys are set based upon table DtableID. If the user does not select a character key, as determined in block 52, the CPU would then look to see if the user had selected a word key, block 56, or if not whether the user selected an insertion point within the text field of the text display screen, block 58. If the user selected a word key, there is a determination in block 60 whether the TableID is MM. If it is determined that the TableID is MM, the MenuWrd is set based upon display position selected by user (Table 1) in block 62. The text field could be selected in different manners, depending on how the keyboard system is implemented. The user would simply touch a portion of the touch sensitive display comprising the text display area with a finger. If the keyboard is implemented in software, so as to appear on a standard display screen and thereby interact with a cursor control device, such as a mouse or a finger contact on a touch-screen device, the user would simply have to click within the text display portion of the display. If the user did not select a position within the text field, the CPU 32 would then go back to waiting. If the user did select a position within the text field, a select signal indicating the insertion point, and thereby corresponding to the preceding character in the text, would be sent to the CPU. The CPU would then proceed to block 90, which is further described below.

Figure 5B:
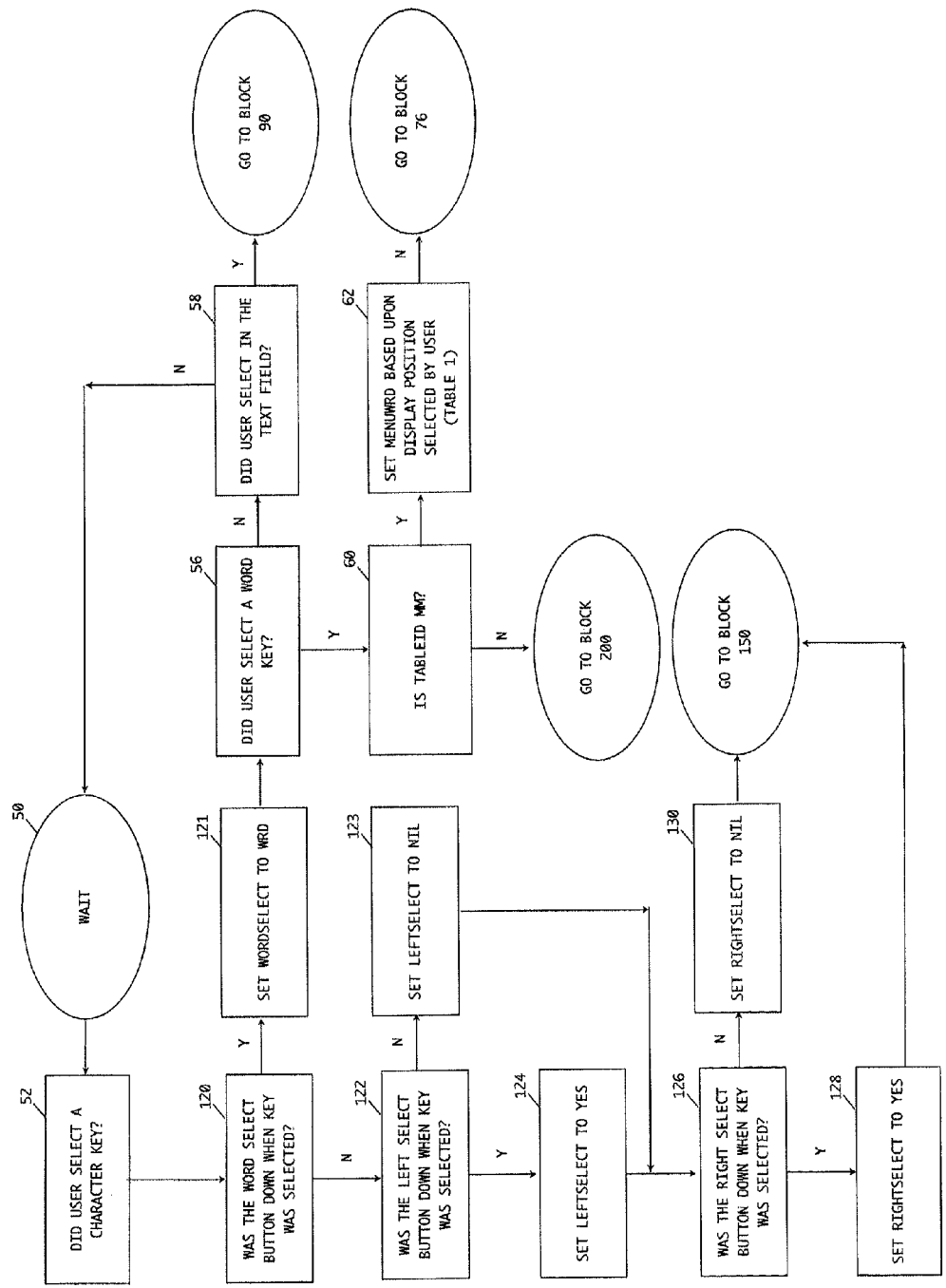

As shown in FIG. 5B, if the user selects a character key, as determined in block 52, it is determined whether the word select button was down when the key was selected in block 120. If block 120 evaluates to yes, the wordselect is set to wrd in block 121. If block 120 evaluates to no, it is determined whether the left select button was down when key was selected in block 122. If block 122 evaluates to no, block 123 sets leftselect to nil and proceeds to block 126. If block 122 evaluates to yes, block 124 sets leftselect to yes and proceeds to block 126, which determines whether the right select button was down when key was selected. If block 126 evaluates to yes, block 128 sets rightselect to yes and the proceeds to block 150. If block 126 evaluates to no, block 130 sets rightselect to nil and proceeds to block 150.

Figure 6:
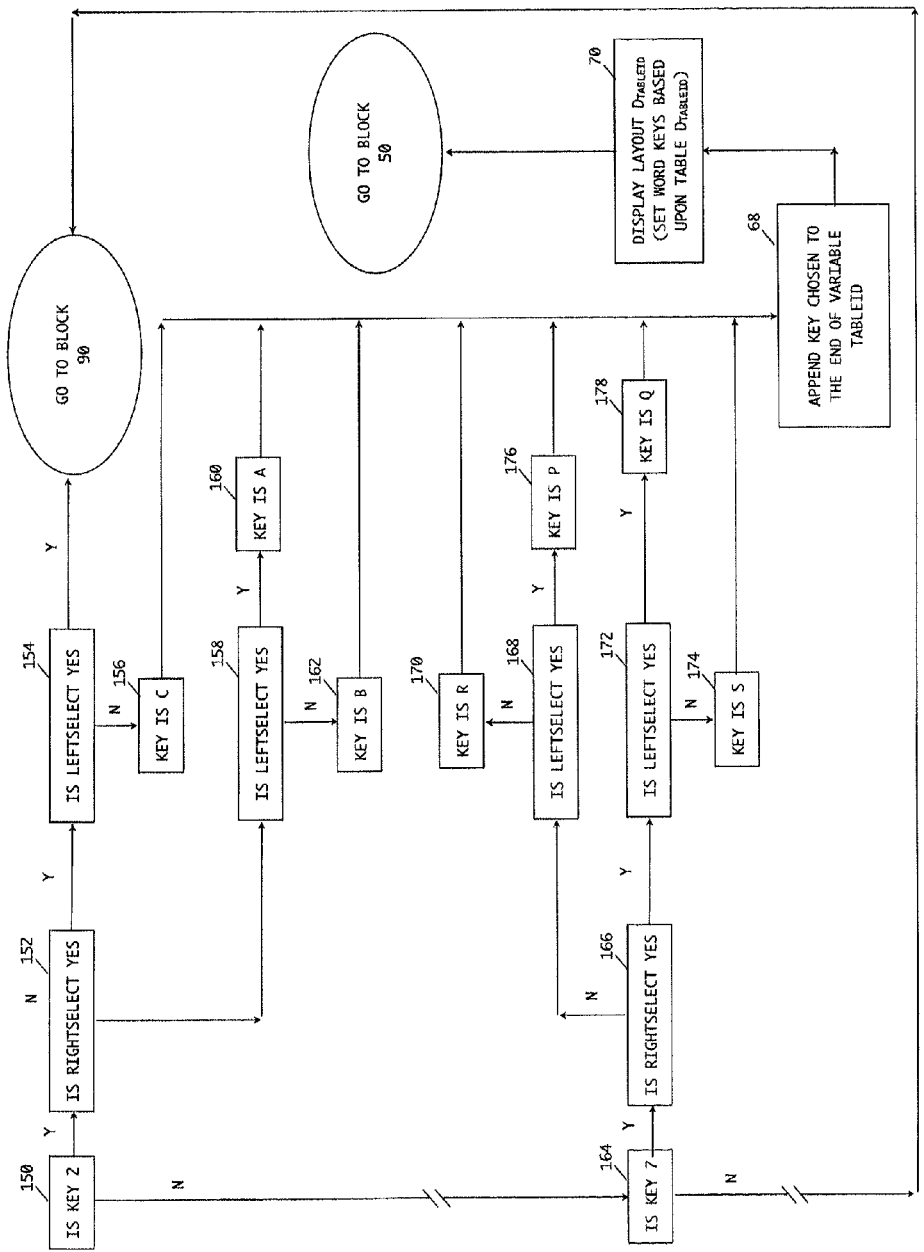

As shown in FIG. 6, in block 150, it is determined whether the key is 2. If block 150 evaluates to yes, in block 152, it is determined whether rightselect is yes. If block 152 evaluates to yes, it is determined whether leftselect is yes in block 154. If block 154 evaluates to yes, processing proceeds to block 90. If block 154 evaluates to no, key is C in block 156. Processing then proceeds to block 68, which appends the key chosen to the end of variable TableID.

If block 152 evaluates to no, block 158 determines whether leftselect is yes. If block 158 to evaluates to yes, the key is set to A in block 160, after which processing proceeds to block 68. If block 158 evaluates to no, key is set to B in block 162, after which processing proceeds to block 68.

If block 150 evaluates to no, in block 164, it is determined whether the key is set to 7. If block 164 evaluates to no, processing proceeds to block 90. If block 164 evaluates to yes, block 166 determines whether rightselect is yes. If block 166 evaluates to yes, block 172 determines if leftselect is yes. If block 172 evaluates to yes, block 178 sets the key to Q and processing proceeds to block 68. If block 172 evaluates to no, block 174 sets the key is S and proceeds to block 68. If block 166 evaluates to no, block 168 determines whether leftselect is yes. If block 168 evaluates to no, in block 170, the key is set to R, after which processing proceeds to block 68. If block 168 evaluates to yes, in block 176, the key is P, after which processing proceeds to 68.

Figure 7:
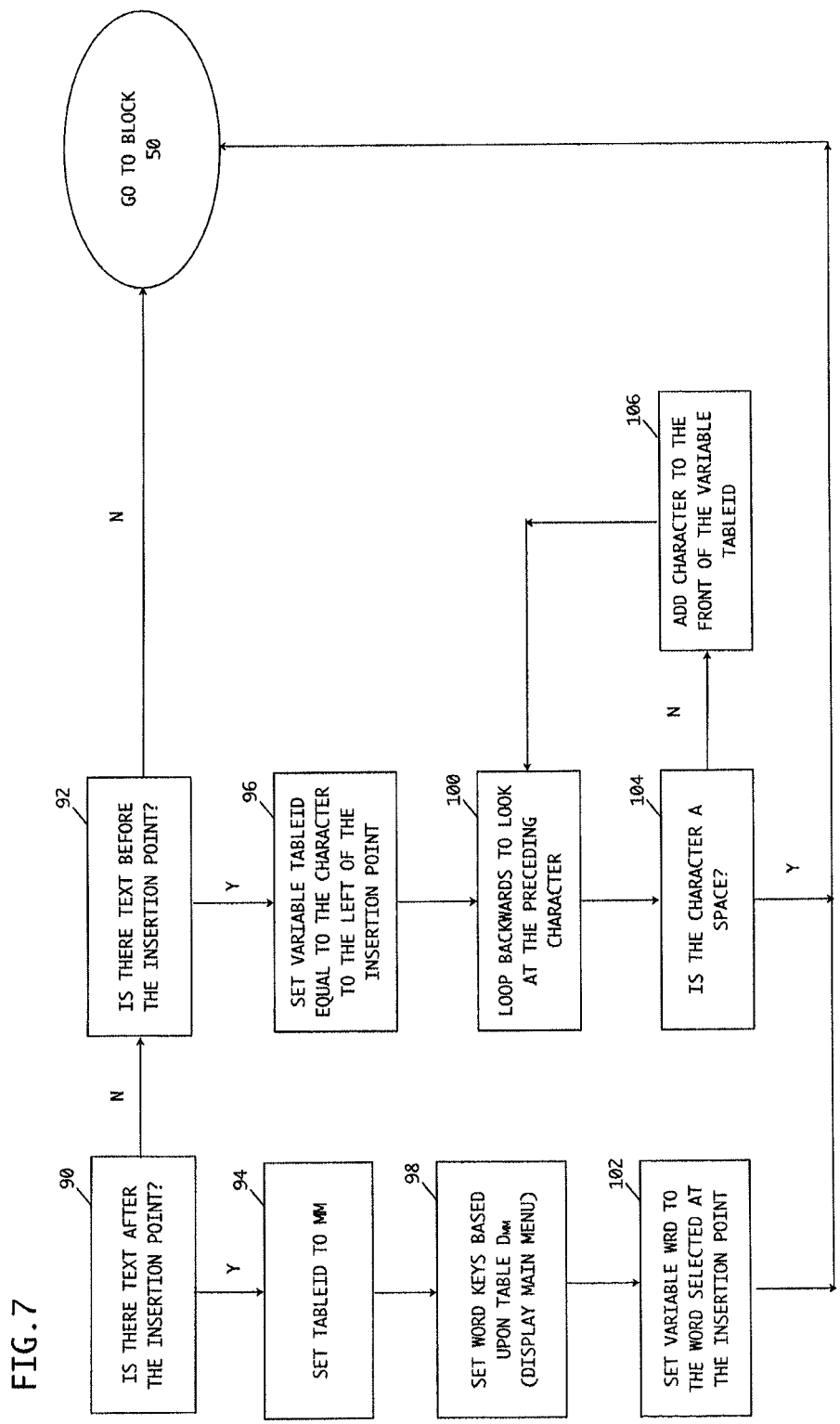

As shown in FIG. 7, in block 90, it is determined if there is text after the insertion point. If block 90 evaluates to no, block 92 determines if there is text before the insertion point. If block 92 evaluates to no, processing proceeds to block 50. If block 92 evaluates to yes, block 96 sets variable TableID equal to the character to the left of the insertion point. Then, in block 100, the CPU loops backwards to look at the preceding character and, in block 104, it is determined whether the character is a space. If block 104 evaluates to no, the character is added to the front of the variable TableID in block 106 and processing again proceeds to block 100. If block 104 evaluates to yes, processing proceeds to block 50.

If block 90 evaluates to yes, TableID is set to MM in block 94, after which word keys are set based upon table Dmm (display main menu) in step 98, and variable WRD is set to the word selected at the insertion point in block 102. Processing then proceeds to block 150.

Figure 8:
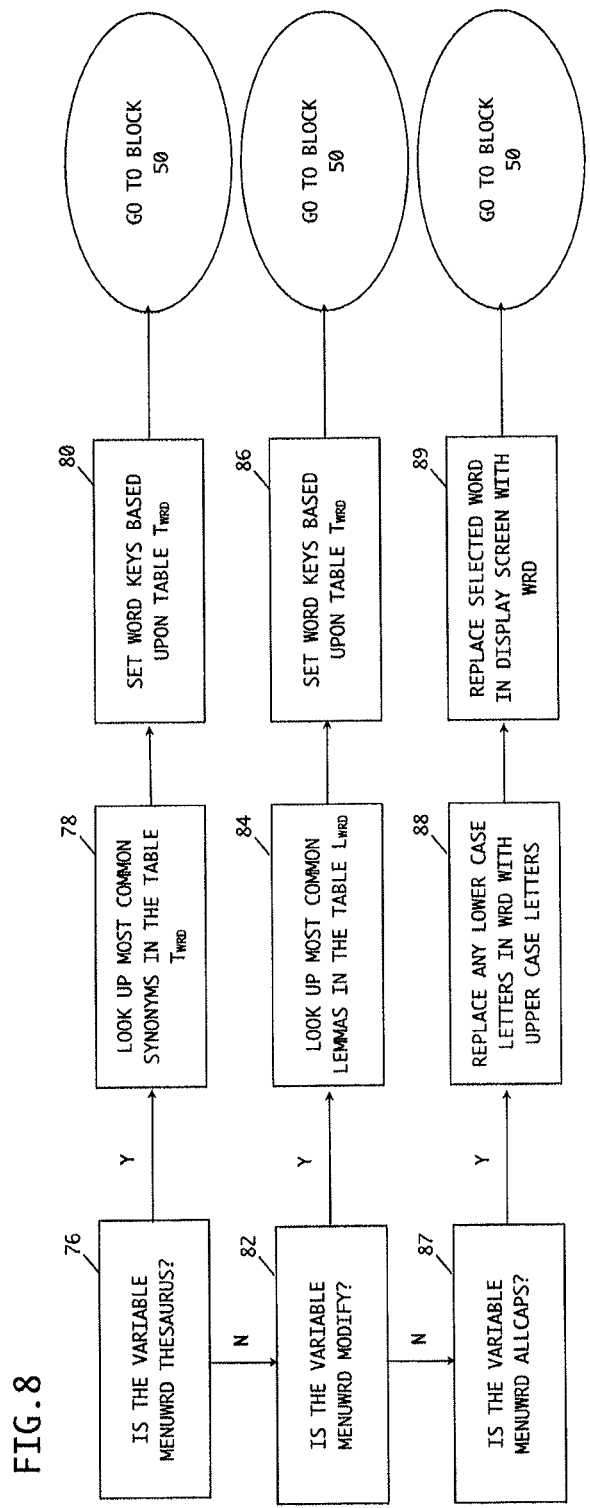

As shown in FIG. 8, block 76 determines whether the variable menuwrd is thesaurus. If block 76 evaluates to yes, the CPU looks up most common synonyms on table Twrd in block 78, sets word keys based upon table Twrd in block 80 and then proceeds to block 50. If block 76 evaluates to no, block 82 determines whether the variable menuwrd is modify. If block 82 evaluates to yes, block 84 looks up most common lemmas in the table Lwrd and block 86 sets word keys based upon table Twrd after which processing proceeds to block 50. If block 82 evaluates to no, block 87 determines whether the variable menuwrd is allcaps. If block 87 evaluates to yes, block 88 replaces any lower case letters in wrd with upper case letter, and block 89 replaces selected word in display screen with wrd, after which processing proceeds to block 50.

Figure 9:
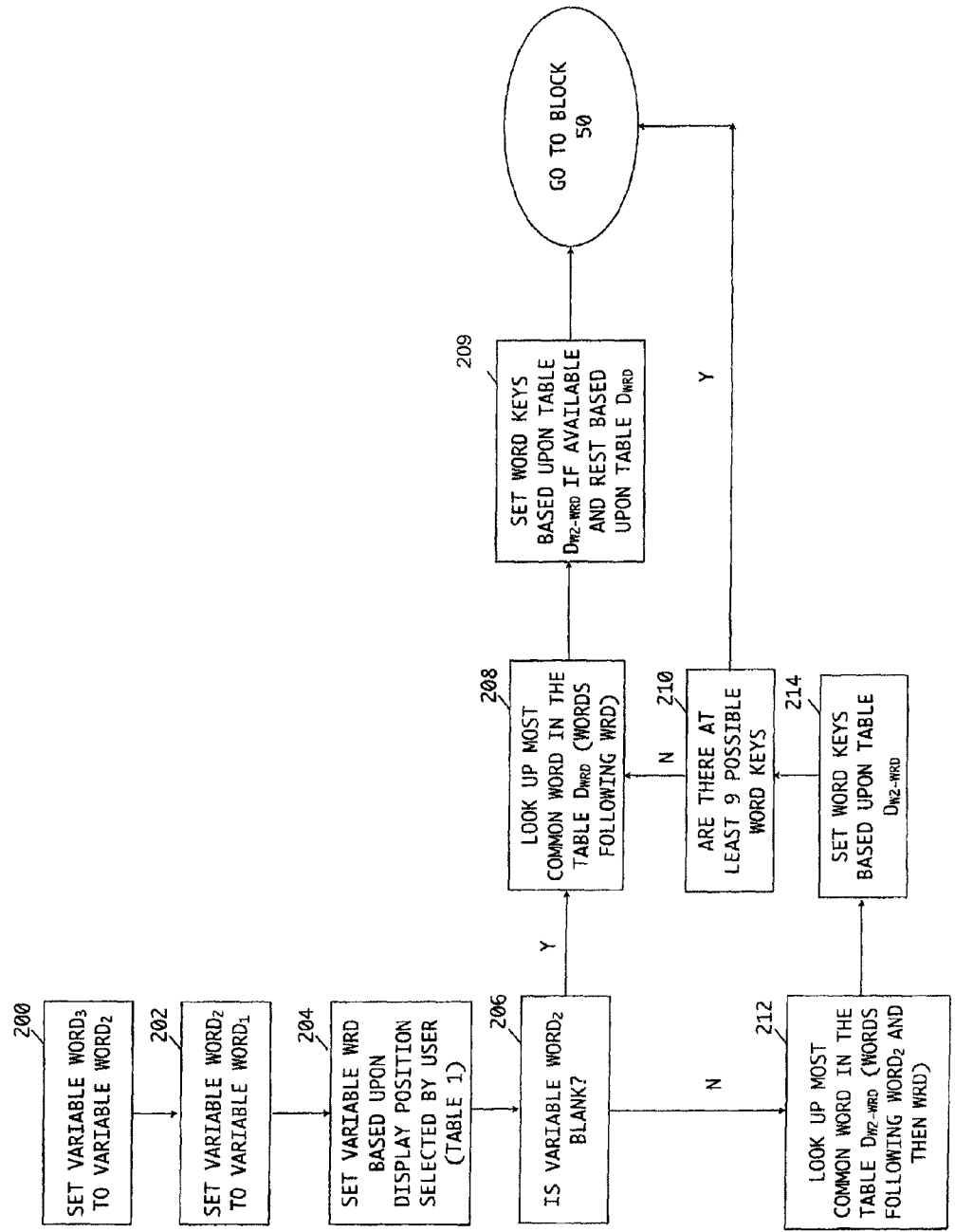

As shown in FIG. 9, block 200 sets the variable word3 to variable word2. The variable word2 is then set to variable word1 in block 202. The variable wrd is then set based upon the display position selected by the user (table 1) in block 204. Block 206 then determines whether variable word2 is blank. If block 206 evaluates to yes, then the CPU looks up the most common word in the table Dwrd (Words following wrd) in block 208. Then, in block 209, the word keys are set based upon table Dw2-wrd if available and rest based upon table Dwrd. Processing then proceeds to block 50. If block 206 evaluates to no, block 212 looks up the most common word in the table Dw2-wrd (words following word2 and wrd). Then, in block 214, word keys are set based upon table Dw2-wrd. Then, in block 210, it is determines whether there are at least 9 possible word keys. If block 210 evaluates to yes, processing proceeds to block 50. If block 210 evaluates to no, then processing proceeds to block 208, discussed above.

The present invention could also be implemented for use in computer systems with a special benefit for use in tablet computers, which generally do not have attached keyboards. Buttons, like any key, could also be implemented as a portion of an interactive display, which could be selected by a cursor or a user's finger. Other implementations could include a cellular phone handset, where current text-input methods are terribly inefficient.

Users could also select a letter by writing the desired letter either with a finger or a stylus instead of typing a letter on a keyboard.

Returning now to block 204, once the variable WRD has been set, the CPU then looks to see whether there was a prior word that had been entered. If so, the program checks to see what word would most likely follow the two words that had just been entered. If the word entered was the first word of a new sentence or there is no prior word because the user has started typing, then the program suggests words most likely to follow the single word.

If the user selected a word in the text, as checked for in block 58, the TABLEID variable will be set to MM, a code for the main menu. This variable prompts the processor to display the functional menu keys in the word keys. If this is the case the CPU looks to see which menu button is pressed by the user. In the example of FIG. 4b, the user pressed the uppercase word button to make the word display in all uppercase characters, the user needed only to press the UPPERCASE WORD key and let go, whereupon the character set layout for the combination of characters will change to uppercase versions of the word shown. Upon selection of a character, the layout is reset to display lowercase characters. If the user selects the key again, the character set layout is toggled back to the prior layout.

In FIG. 5a, the electronics system associated with the device, as generally described in FIG. 2, initially starts off by waiting, block 50, for the user to either select a character key 26 or select an insertion point within the text field of the text display screen. Upon receiving a select signal, the system first asks whether that signal was generated as a result of the user selecting one of the keys 26 or on of the word keys 28 from within the display screen 30, block 52. If the user did select a word key, the row and column of the display corresponding to that key, and therefore its corresponding character or functional menu, are reported to the CPU as the select signal. The CPU then sets a variable named "WRD" based on the reported display position selected by the user, block 204. The value assigned to the WRD variable corresponds to a position within a look-up table stored in memory 36 containing data for creating images on the text display corresponding to selected characters. A look-up table in accordance with the present invention, corresponding to a keyboard having a maximum of three rows and three columns of word keys, and corresponding to the word set display screens illustrated in FIGS. 5a through 5d, is shown above in Table 1, with corresponding rows from the display running from top to bottom and corresponding columns from the display running from left to right. As there are hundreds of thousands of potential word key sets in the statistical analysis, the data shown in Table 1 represents only a sample of the necessary data.

FIG. 5b represents the flow chart for the cellular handset embodiment to see if a word key was pressed and adds a process whereby the system checks in FIG. 6 to see if one of the alternative buttons was selected and uses this information to determine which character the user selected when pressing the keypad button. In this embodiment, the right and left option buttons allow for the immediate selection of a letter without having to cycle through four or more characters. Another approach would be to have four-way rocker buttons that could allow for the various characters to be selected by which direction the button was pushed or have a dual pressure switch with a deeper press signaling a word button. In FIG. 6 if the user is pressing both buttons and the key only has three possible letters then it sends the program back to block 50 to wait for an appropriate character. This could also have T9-based systems with the 9 word buttons based upon the frequency of any of the most likely words that could be formed form all of the possible letter combinations that could occur.

FIGS. 7 and 8 show a continuation of the flow charts illustrated in FIGS. 5a and 5b and further illustrate the process of determining the word menu selection. In FIG. 7 the system checks to see if the user has clicked in the display to edit a word that has already been entered. In the event that it has, word keys are replaced with menu commands and these menu commands perform changes to text that has already been entered by the user. Three examples are shown in FIG. 8, a thesaurus, an "all caps" button and a "modify" button. In each case, the menu words change to new selections that will replace the selected word. In the example the replacement will be either a word from the frequency-based thesaurus, an upper case version of the word, or a way to modify the word such as changing the lemmas.

If the user typed a word key, the system checks in FIG. 9 to make an assumption of the next word based upon a review of the 3-n and 2-n word list. It is possible to check a 4-n and 5-n or more word list as well, but there is a trade-off between finding the most likely word and the time it takes to check through all of the frequency-based data in a rapid fashion so that the user will not have to wait for the result. As technology keeps getting faster, it may be useful to add more analysis to the system. Other checks that could be done relate to grammatical usage of words which would make various word choices more or less likely. In the case of FIG. 9, if there are two prior words, it will look up the most likely next word that follows the two prior words and set the word keys to the top choices. If there is only one prior word or there are not enough choices for all of the squares from the 3-n list, it will use the 2-n list to fill in the remainder of the word buttons.

TABLE 2 below shows the significant reduction in keystrokes that result from this improved keyboard. In the event of a standard keyboard, the number of letters in each word was multiplied by its frequency in the corpus to arrive at a weighted average word length. The weighted average word in English has 4.5 letters, requiring 5.5 keystrokes including a space or punctuation. For the improved corpus-based keyboard that uses the frequency that each word appears in the language and the frequency that a word follows another word or pair of words that allows keystrokes to be reduced by over 50%. While the weighted average word in English has 4.5 letters, requiring 5.5 keystrokes including a space or punctuation, the weighted average keystrokes to type a word using this improved keyboard is 2.0 keystrokes. Because complete words are chosen, the keyboard also provides a meaningful benefit to users as it leads to almost the complete elimination of typographical errors, which studies have shown to range as high as 6%-8%. For standard cellular phone keypads, there can be two meaningful improvements made using this frequency-based system. By analyzing the frequency of the letters the phone can suggest the letters in a frequency-based way instead of alphabetically requiring 27% fewer keystrokes to send a text message. Further improvement can be achieved by using the word-based frequency methodology, which can reduce user keystroke entry by 78%.

option of sharing their data to allow the corpus to continue to improve with words and frequency tailored to the particular applications, industries, regions or context.

Figure 10B:
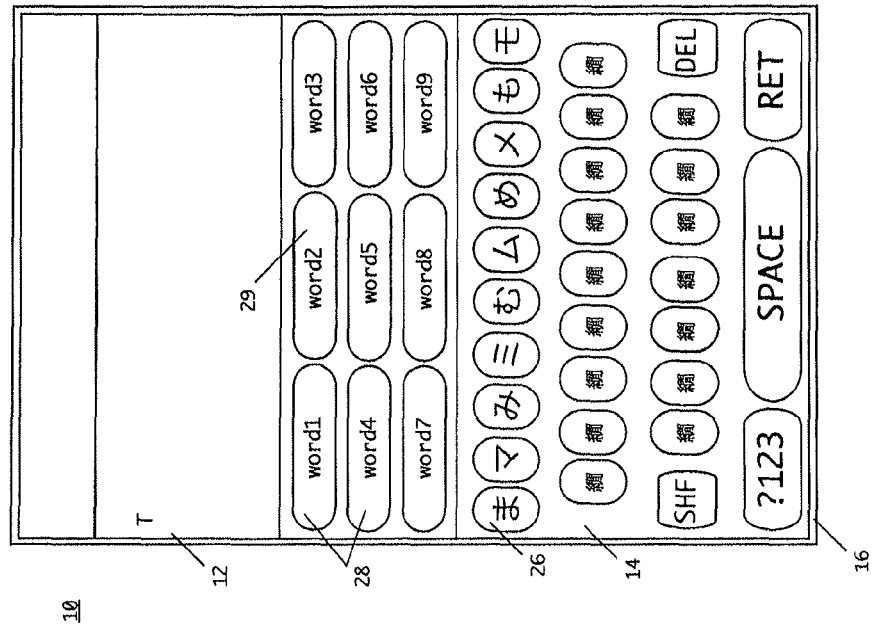
Figure 10A:
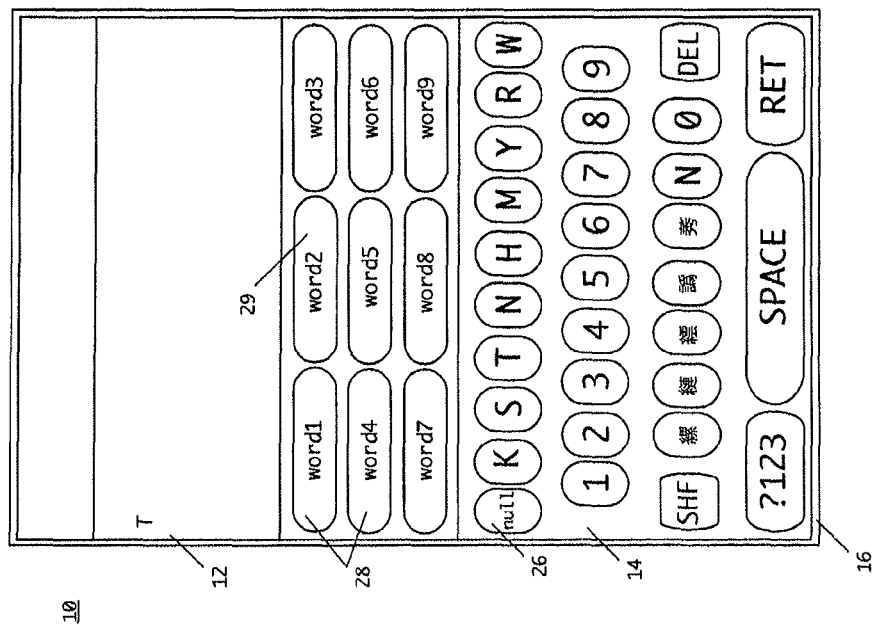

For languages with many characters, such as Japanese, which has 50 characters, the keyboard can be improved by separating out the vowels from the consonants. The first row of ten consonants is selected on the first screen as shown in FIG. 10a as well as the number keys and or the most common Japanese words. After the initial consonant is selected or bypassed for words starting with a vowel sound a second screen, shown as FIG. 10b, has the characters that could possibly be chosen, after which time the menu keys would select the most likely next word. The additional spaces in the keyboard could be used for additional choices, as the character-based language has more possible combinations. In this embodiment, assuming a touch screen data entry, the user would select the consonant-vowel-word to make characters that form words.

Figure 11A:
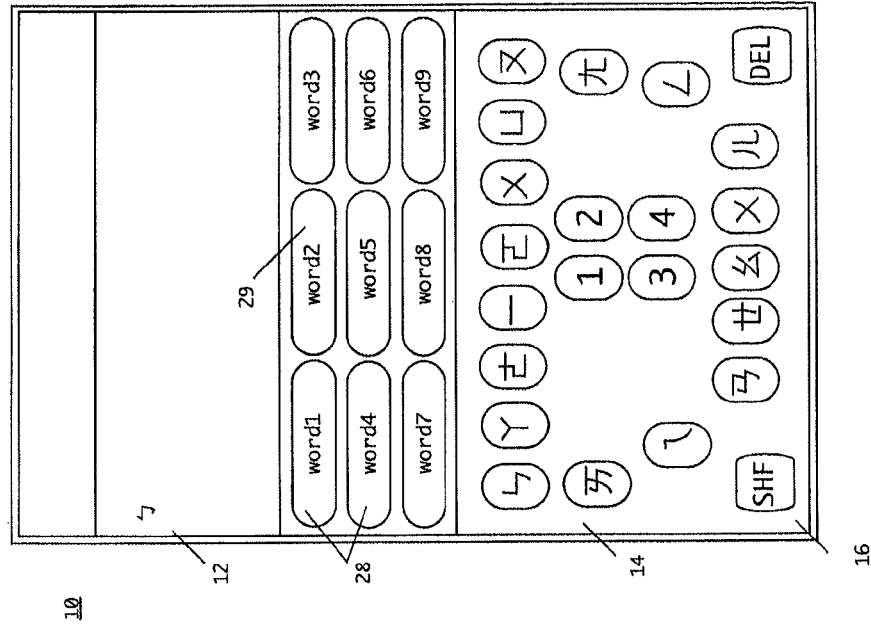
FIGS. 11a, 11b, 11c and 11d are schematic illustrations of a dynamic predictive keyboard employing a foreign language in accordance with the present invention.
Figure 11B:
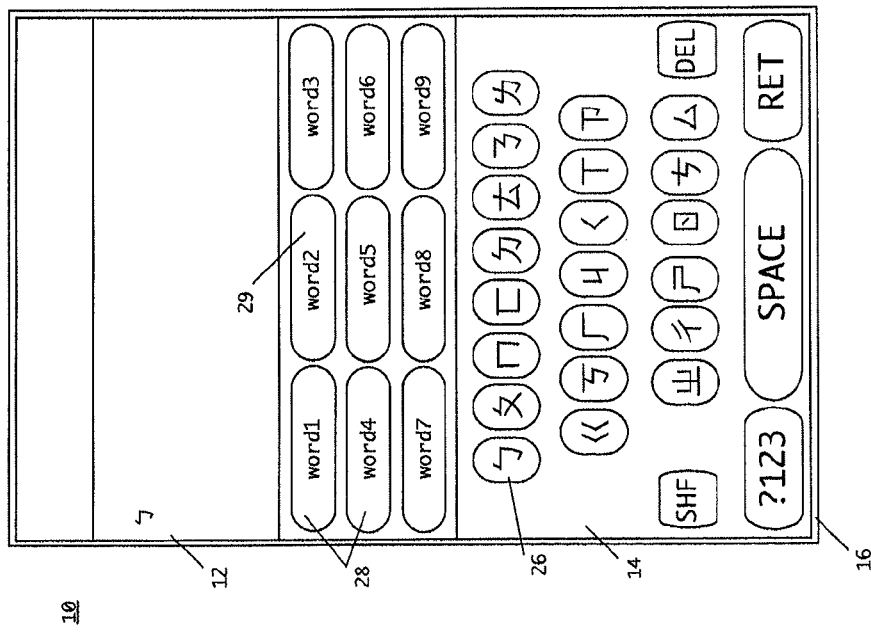
Figure 11D:
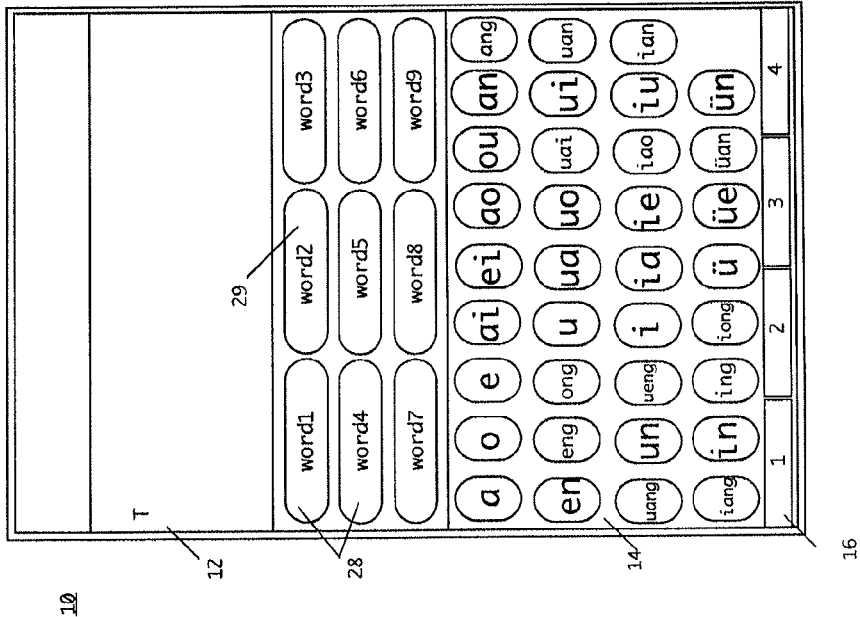
Figure 11C:
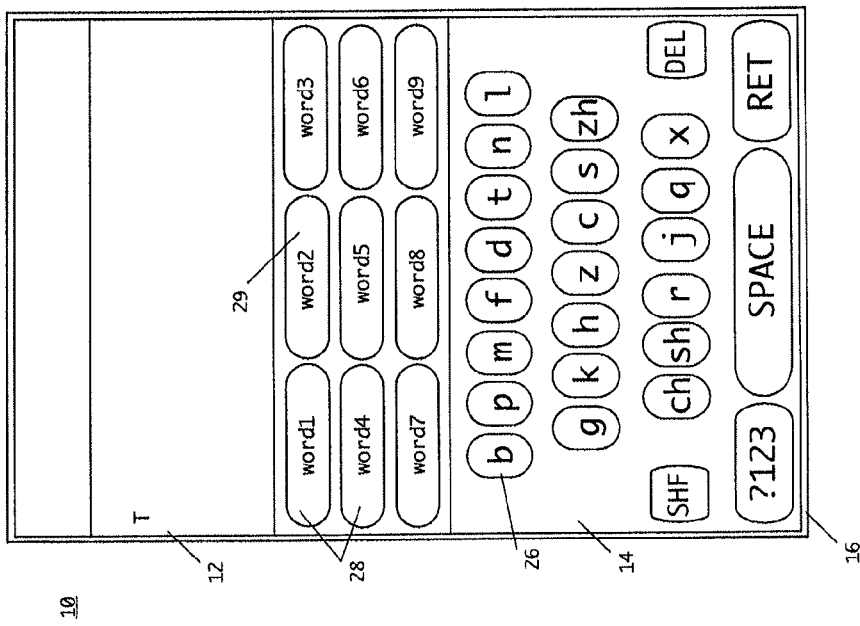

For more complex languages like Chinese, another embodiment is used where the first keyboard has the beginning consonants. In Mandarin, the most common Chinese dialect, there are 21 beginning consonants is shown in the Bopomofo phonetic alphabet used in Taiwan (FIGS. 11a and 11b) and Pinyin used in Mainland China (FIGS. 11c and 11d). After typing one of these beginning consonant sounds or bypassing them for words starting with a vowel sound, a keyboard is displayed with the vowel sound surrounding one of the four tones or below them. In this method, each click of the consonant and extension of the vowels can produce

TABLE 2

| | Current Keyboard | Frequency Generated Word-based Keyboard | Current Cell Phone Keypad Based Entry | Frequency Based Keypad Text Entry | Frequency Generated Word-Based Text Entry |
|---|---|---|---|---|---|
| Wt. Average Keystroke per Word Entered (includes space) | 5.6 | 2.0 | 8.9 | 5.5 | 2.0 |
| % Reduction in Keystrokes from Current | | 65% | | 27% | 78% |

By using the word-based input, the improved keyboard has additional benefits including easier corrections and word changes and an ability to replace words using a thesaurus. If a punctuation symbol is selected the space is removed before it is added. As entire words can be typed instead of a letter for over 50% of the time, this keyboard provides a substantial improvement in speed and accuracy of typing. In addition, it can be implemented so that the user can edit the word list allowing an individual to modify the list to include their own commonly used words and further improved to suit a particular user's need. While the list shown in the exhibits contains 9 word keys to maximize the efficiency in the English language, the number of word keys can be changed based upon statistical benefits in other languages or for special subsets such as grocery items or medical terms or user preference.

The organization of the words on the list can be based on the frequency of those words or alphabetical. The keyboard can be implemented to operate as either a touch-sensitive display or as a collection of interactive images on any of a number of different displays. The keyboard can also be used in conjunction with the special function keys or buttons that are common to computer system for performing function-character command operations. The number of times a user selects each word can be tracked and users can have the one of 1600 characters. After the initial character is entered, the corpus data is used to predict the next word significantly speeding typing.

Figure 12B:
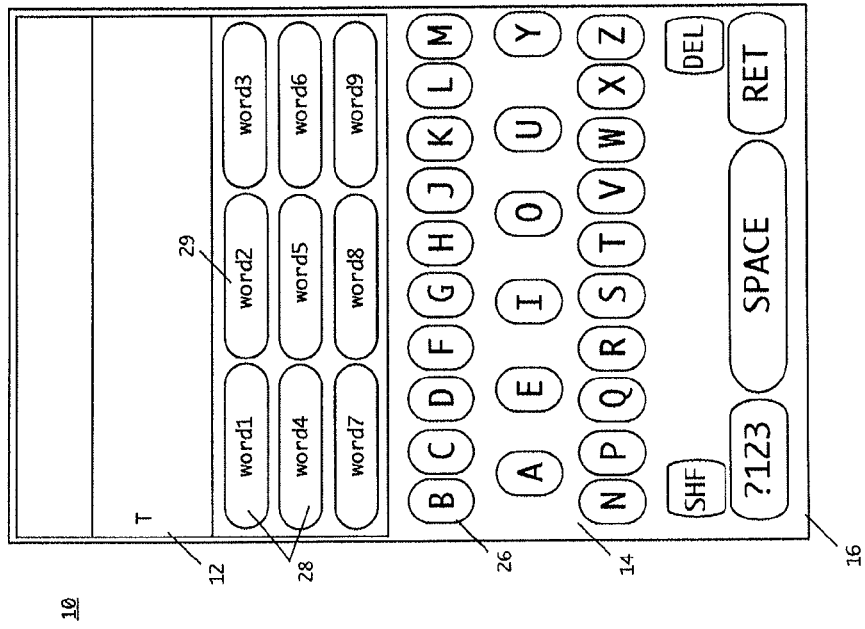
FIGS. 12a and 12b are schematic illustrations of dynamic predictive keyboards in accordance with further embodiments of the present invention.
Figure 12A:
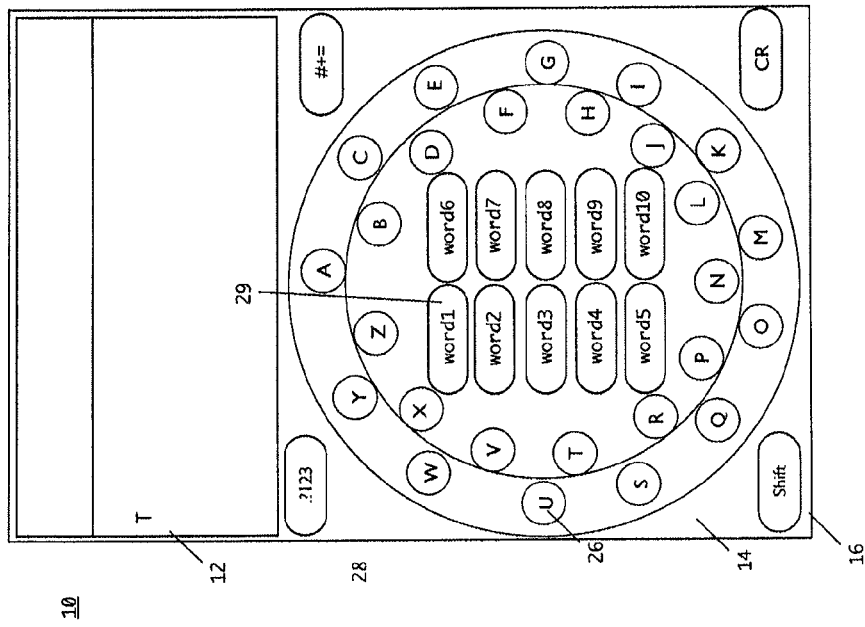

For people unfamiliar with the layout of a QWERTY keyboard, a more intuitive alphabetical circular keyboard can be used as in FIG. 12a can be displayed that allows the user to slide or tap from one key to another using their existing knowledge of the alphabet, or in FIG. 12b the consonants can be displayed alphabetically in two rows with vowels between them allowing the user to slide or tap in a similar way.

Additional Features/Capabilities

In connection with various embodiments as described above, the present invention may include additional features and/or variations, such as provided below. Some of these features are also described above.

The keyboard or other input device may include additional buttons that allow for the selection of one letter from a key that normally represents a number, or two or more letters. The added button may be a rocker button that allows for the selection of, for example, five choices from a key. The input device may include buttons that are split into two or more pieces for the selection of multiple choices from a key that normally represents a number, or two or more letters. The input device may include a multilayer keypress that allows for the selection of word keys by pressing down past the initial pressure switch on a key. The input device may include additional buttons on the back of the device to provide further user capability of selection in accordance with the present invention. For example, buttons 13 on the back of the unit as shown in FIGS. 1 and 2 relate, when pressed, to word buttons displayed on the display. In one particular implementation. the 3 buttons on the left-side of the back of the unit relate to the 3 word keys shown in the left-hand column on the display (i.e., on the front of the unit), the 3 buttons on the right-side of the back of the unit relate to the 3 word keys shown in the right-hand column on the display, and depressing respective right and left hand buttons on the rear of the unit relate to the word keys shown in the middle-column. For example, depressing the two top buttons on the rear of the display correspond to the word "that" as shown in the middle column, top row on the display. The back of the unit may have a different number of buttons (e.g., 4 buttons, 8 buttons, etc.) or a rocker switch that could be moved in multiple directions or a touchpad to select the word buttons.

Additional features of the present invention include providing selection buttons, i.e., function icons, that correspond to actions for causing the display device to show one or more of the following: synonyms of the word images, a thesaurus which could also be frequency-based, editing of the word images, a user's specially entered set of words, or phrases, and/or a user's address book data in the word images. Additional optional features include providing function icons that correspond to actions: for putting quotes or parentheses around the word images; to change the tense of a verb; to change plural to singular and vice versa; to change adjectives and adverbs between their standard and comparative and superlative forms; and to change a word from upper to lower case, vice versa, or to its proper case and to add adjectives to nouns.

The device may further include the following capability: the ability to sense multiple keys held down at the same time to allow the keys to perform additional functions, such as selecting a word key; to have a touch sensitive surface to provide function keys that can be touched to perform various operations or additional operations; and to include an accelerometer that, when activated (e.g., by shaking the unit beyond normal movement) carries out a function and, in accordance with the invention, such function may be to delete a word. The keyboard may further display a punctuation selection in the word keys by double tapping the space bar, including adding paragraph marks and bullets as well as common punctuation marks.

Other features includes the device displaying a more complex word by holding a word button for a relatively long period of time (e.g., 2 seconds) and then inserting the word without a follow-on space thus allowing a longer word to be built more easily. Keys or word keys may be color-coded based upon frequency to make it faster to find the desired key or word key.

Word list selection/display may further take into account the following: comparing the last n-words to a statistical listing that predicts the most likely next word; and comparing the last n-words to a statistical listing that will predict the most likely next word should the next word not be predicted from the last n-words. Feedback data may be stored based on word images selected by the user and sent to a central location where the data is combined with data from others to refine the statistical predictions.

As stated earlier in this document, the term "word" includes phrases. Hence, in any of the embodiments described herein, a listing of phrases, as well as word and phrase combinations, may be provided based on frequency of usage. Moreover, a user's most frequently used phrases may be saved as macros to enable the user to quickly call up a desired one of any of those frequently used phrases.

Demographic, Context, Location Based Word/Phrase Processing/Lists

Rules for defining the set of word images to display in accordance with the present invention may take into account selection of text based on usage by the general population or by a select group of users, such as a specific demographic group (e.g., gender of user, age of user, ethnicity of user, etc.). Rules based on demographics preferably are user-selectable, wherein the user provides preferred demographic data, or based on demographics automatically derived from user text entry and other information, such as account information related to the device (e.g., telephone company account information). If demographic data is manually provided, the device/software may be designed to provide the user with added capability or a chance to get a benefit of some sort in order to entice the user to supply demographic as well as usage data. In any of these cases, the present invention can employ a master dictionary with weightings of words that change based upon the factors that are utilized in the rules. For example, a sixty year old user might get in the word list Johnny "Mathis" (after typing "Johnny"), whereas a 40 year old user may get Johnny "Depp". As another example, specialty type of dictionaries may be employed for users who designate particular professions, such as medical, real estate, dental, legal, etc.

Moreover, rules for defining the word sets to display may take the location (e.g., region of a country, urban area, rural etc.) of the user into account. More particularly, rules for defining word lists, as well as phrase lists, may be based in part on the user's current location. In such case, the location of the user must be identified preferably automatically using technology included within the device or system implementing the present invention. Currently, many portable devices, including cellular telephones, have location identification technology and are fully capable of identifying the location of the user. Location data may be obtained in other manners, such as based on radio transmission, manual identification of the user, or by any other suitable manner. Word frequency usage for select words and phrases is different in different regions of a country (e.g., East Coast, West Coast, South, etc.) or may based on another geographic criteria (e.g., city-area, rural area, etc.). Hence, word sets of English-language words (or of another language) may vary based on the location of the user. In addition, words sets that take into account famous (or even not-so-famous) points of interest, persons, places and other things may also take user location into account. For example, entry of "Lincoln" may provide the follow-up optional word selection "Memorial" when the user is in the Washington D.C. area or may provide the selection "birthplace" (or something related to birthplace) when the user is in Kentucky (i.e., Abraham Lincoln's birthplace). Well-known or famous streets, towns, or other place names may be included, including sports teams, athletes, members of Congress, etc.

Rules for defining the word sets may further take context into account. For example, if the user is writing about auto-racing, then typing "ti" results in "tires" having a higher likelihood of occurrence than "ties" thus impacting the words that are displayed, as well as their order. The rules may further take both context and location into account. For example, when the user is writing about food or food types, words representing types of food take local usage into account. In such case, the term "hero" is provided a high weight in New York, while "hoagie" is provided a high weight in Philadelphia, and "po-boy" is provided a high weight in New Orleans.

Other Types of Documents/Entries: Forms, Surveys, Tables, Telephone Dialing

In addition to the entry of text in text messaging operations, emails, word processing documents and other documents mentioned herein, the present invention may be applied to the entry of data within other types of documents, including forms, surveys, and tables. For example, answers to questions in a form or survey may populate the buttons with frequency-based data to improve the speed and usefulness of such forms and surveys. The present invention further may be applied to frequency based telephone operations, where the frequency of calls dialed or received determine a variable dynamic speed dial button to improve the usefulness of the phone. For example, speed-dial buttons/menus may be based on telephone calls made within a prior period of time, such as within the last 2 days or 30 days having the call data sorted by frequency of calls received during that period. In addition, typing the number "7" can cause the speed-dial buttons/menus to show only the identity of individuals who have been called within the last two weeks whose telephone number begin with a "7". Moreover, the displayed persons may be ordered based upon call frequency to such persons. Other variations may be employed.

The present invention may employ other types of documents, such as forms, and at the same time take other criteria into account, such as context-based factors. For example, a dynamic data entry form that is context based and specifically tailored to a medical application may employ word/phrase selections specifically related to the medical provider's queries and likely responses of the patient. In such case, a doctor examining a patient with a high temperature can select the "fever" button which in turn provides suitable descriptor words/phrases "mild", "high", "102", "103" etc., thereby allowing the medical provider to quickly identify within the form, record or other document a particular condition of the patient. The selectable word/phrases are frequency based in accordance with the present invention and may vary based upon the user's particular styles and selection history. Other types of forms that may be employed in accordance with the present invention include surveys. As one feature, the device takes frequency based analysis of the choices/answers selected into account for the purpose of providing the appropriate follow-up questions, thus obviating the need to "skip" questions as it typical in surveys.

The present invention further may entail using the devices described herein to be the data entry input device for forms and other documents stored on/displayed by another intelligent electronic device, such as a general purpose computer. More particularly, a device employing the present invention, preferably a portable device, enables a user to enter data, and the other device (e.g., general purpose computer) displays the entered data into the appropriate location, e.g., in a form, and a menu of word options is displayed to the user on either the portable device or the general purpose computer. For example, the computer (e.g., a desktop computer) with a relatively large monitor displays a form of some type, and the user enters text (e.g., a letter) on the portable device, calling up a menu in accordance with the present invention. The menu containing selectable words or phrases may be provided on the portable device and/or on the monitor of the general-purpose computer. The user may then select one of the displayed items in accordance with the present invention. Hence, as illustrated from the foregoing, the present invention includes a system containing multiple intelligent devices communicating with one another usable to implement the various features of the present invention.

Standard Keyboard & Computer Applications

The present invention may further be applied to a standard keyboard/computer, wherein entry of a key causes the computer to display (e.g., within a region of the monitor separate from the text field) a word menu having a selectable number of entries and subsequent depression of a particular key calls up the selected entry. Preferably, the menu includes 9 (or 10) selectable options that are selected by depressing one of the numeric keys 1 through 9 (and, optionally, 0). For example, Table 3 below shows a menu with 9 selectable words that is displayed after typing "T". As previously described, the displayed words are provided based upon frequency usage and potentially other criteria (e.g., user demographic, location, context based, etc.) as described herein.

TABLE 3

| 1) than | 2) that | 3) the |
|---|---|---|
| 4) their | 5) them | 6) there |
| 7) they | 8) this | 9) to |

Then, any of the 9 words that are displayed is selected by depressing the numeric key corresponding to the desired word. If, however, a numeral is to be inserted, the user can depress a numeric key and hold it down for a preset period of time (e.g., 1 second). Other manners of indicating that a numeral is to be inserted may be employed. For example, depressing shift-control or other type of command key before or during depression of a numeric key likewise indicates that a number is to be inserted in the text rather the corresponding word in the menu. Alternatively, depressing a number key (by itself) causes insertion of the selected number, where the corresponding word in the menu is inserted upon depressing a command key of some sort simultaneously with a number key (or holding the number key down for a preset period of time or having a keyboard that requires a deeper press to activate a second function of the key). Other known manners of distinguishing between selecting a menu item or the actual key depressed may be employed.

In the example provided above, wherein table 3 is being displayed, the user depressing the "6" key results in insertion of the word "There" and the menu of selectable words changes as shown in Table 4 below.

TABLE 4

| 1) and | 2) are | 3) has |
|---|---|---|
| 4) in | 5) is | 6) was |
| 7) were | 8) will | 9) would |

Then, depressing the "9" key provides "There would". Hence, typing on a standard keyboard the key pattern T-6-9 produces the phrase "There would". Accordingly, various processes and features described herein may be implemented via software alone using off-the-shelf general purpose computer technology.

As a variation of using solely number keys on a keyboard, the displayed menu of word/phrase selections may be color-coded to coincide with keys on a keyboard that also are color-coded. Color-coding can be user-defined, wherein keyboard templates or customized keyboards (with colored keys) are provided. Other manners of providing colored keys may be employed. In addition to or as another variation, a numeric keypad may be employed.

With any of the variations mentioned herein, the present invention may be embodied within a word processor program (or other program) as an add-in or be built directly into the software.

Text, Speech Analysis & Recognition, Transcription Applications

In accordance with various additional embodiments of the present invention, any of the above described methodology and technology may be employed in text analysis and/or recognition. In particular, text analysis includes spell checking of text and recognition includes OCR applications/technology, speech recognition and transcription applications, as further discussed below. For any of these applications, frequency-based analysis of the present invention as herein described better identifies words that are mis-typed, mis-spoken, incorrect or otherwise hard to recognize based upon various reasons, such as loss of data in the case of OCR applications.

In a spell checking operation of the present invention, which may occur during or after completion of typing, each word/phrase is compared to the frequency-based data and a replacement word/phrase is suggested or, optionally, automatically replaces a word/phrase that appears incorrect due to a typographical error. The suggested replacement is the most likely frequency-based word or phrase based on analysis of the incorrectly typed word/phrase and/or prior words/phrases in the document. In an optical character recognition process of the present invention, the above-described spell checking operation is modified to take into account the likelihood of the existence of missing and/or unclear data (e.g., in the scanned document undergoing OCR). In accordance with the present invention, spelling checking and character recognition (i.e., OCR) may take account in its frequency-based analysis words and phrases that occur after the word or phrase that appears to be incorrect. Moreover, with respect to optical character recognition, the estimated number of letters of the correct word preferably is derived as a function of the amount of space (i.e., physical distance) between the two words appearing before and after the incorrect (i.e., blurry or missing) word, and the replacement word that is selected is based on frequency-based usage as described herein and the estimated number of letters of the correct word. Using both of these criteria in turn provides far better results than currently available optical character recognition technology. With regard to estimating the length of the correct word, letter estimates take into account the size of at least the adjacent words (optionally, the size of non-adjacent words as well) and the letter font. For blurry or missing words appearing at the edge of a line (i.e., without two adjacent words), length estimates may further take into account the positions of words appearing above and below the incorrect or missing word so that the beginning (or the end) of the blurry/missing word may be approximated. Letter estimates may be a range, such as 2 to 4 letters, 3 to 5 letters, 6-9 letters, or another range. Then, only words within the estimated letter range are considered as viable replacements. In a variation, the process is, in a sense, reversed wherein each of a certain number of words (e.g., 10 words) that may be possible replacement words based on frequency of usage analysis is analyzed to assess if it is of proper length (based on spacing considerations mentioned above). By disregarding words of improper length, a reduced set of likely words is produced. The words in the reduced set are further considered and the most likely word based on frequency of usage analysis is selected as the replacement word. Optionally, additional criteria may be employed such as context-based analysis, as herein described.

The present invention further may be applied to speech/voice recognition and the process operates in a manner similar to optical character recognition but applies voice recognition technology in combination with the herein-described frequency-based processes. Similarly, the present invention may be applied to transcription technology/applications. In particular, the transcriber is provided with the most likely choices (e.g., words, phrases) on a monitor, such enabling the transcriber to quickly pick the correct word/phrase just spoken based on frequency of usage and other criteria (e.g., context based, etc.) as herein described. Hence, transcribers are provided with the capability of selecting the word(s) that have been most likely spoken without the need to interrupt and to request clarification of what was just said. Moreover, voice recognition and transcription in accordance with the present invention may take subsequently spoken words into account, as well as prior words, to ascertain a word/phrase that appears incorrect or other unascertainable. Still further, voice recognition and transcription may also take timing considerations into account to ascertain the approximate length (in time) in which the unrecognizable spoken word was spoken, similar to ascertaining the approximate length (i.e., number of letters) of the blurry/missing word in OCR applications discussed above. Timing considerations include the pace of speech of the speaker, the length of time between the "adjacent" (in time) words and other speech characteristics that may impact the analysis. Then, each possible replacement word is analyzed to assess its approximate spoken length of time and words having a speech time well beyond the estimated length of time of the correct word are removed from consideration. Possible replacement words having lengths of time far shorter than the estimated length of time of the correct word are not automatically removed from consideration since the speaker may have taken a pause. However, further speech analysis may reveal that the speaker is speaking at a steady rate with minimal pauses. In such case, possible replacement words with far shorter lengths of time than the estimated length of time of the correct word are removed from consideration. If necessary, other criteria, such as context based analysis, may be employed to ascertain the correct word.

Data Compression

The present invention may further be applied to data compression. Accordingly, in accordance with yet further embodiments of the present invention, the above described methodology and technology may be employed to perform data compression for various purposes, including more efficient storage, data transmission and translation of text into different languages (further described below). In accordance with the present, by using a master frequency based list and coding each word or phrase into proxies significant data compression is possible. For example, if the word "improved" is the $93^{rd}$ most frequent word starting with the letter "I", it can be coded as I93, and if the word "compression" is the $1086^{th}$ most frequent word starting with the letter "C" it can be coded as C1086. As one integer takes up only half of the space as one letter, the coded I93C1086 would represent 5 alphanumeric characters while the phrase "improved compression" would be 20 characters for a storage savings of 75%. By further coding common phrases, the compression could be further increased.

Data Transmission

After compression of data as per the discussion above, the compressed data can be transmitted more efficiently and uncompressed at the receiving end by using the same algorithm. This can allow for a significant improvement in transmission, in line with the improvement in compression.

Data Codes

In accordance with yet further embodiments of the present invention, the above described methodology and technology may be employed to expand the capabilities of data codes (e.g., QR code, DataMatrix, Semacode). Expansion of data codes may be accomplished in various manners in accordance with the present invention. In one version, the code organization gives a unique tag to a word or phrase that can be any length with the actual text embedded in the reader program that can be continually updated through software to contain a constantly growing array of new information. In another version, an algorithm is used to take a set of known dictionary items and create a more complex phrase using parts of the current code. In this case, the URL creator could work within the confines of the dictionary to create a URL link that can be created with the existing list or the system could use a combination of the existing list with periodic software updates. As the existing word list could contain hundreds of thousands of words and phrases, the possible combinations are likely to be sufficient for most all possible situations.

For example, the URL http://www.uspto.gov/main/patents.htm can be combined from the phrase "http://www." followed by the proxy for "us" followed by a delete space code followed by the letter "p" followed by the proxy for the word "to" followed by the proxy code for ".gov" followed by the proxy code for the symbol "/" followed by the proxy for the word "main" followed by the proxy for the symbol "/" followed by the proxy for the word "patents" followed by the proxy for the word ".htm" this would reduce the 37 character phrase which is the equivalent to 74 numbers to 56 characters. The proxy phrase of "H3982/2U1/2p88/2T5/2.7/1/2M9/2/1/2P99/2.8" would come from the sequence shown in Table 5 below.

TABLE 5

| | |
|---|---|
| H3982 = "http://www." | 6 |
| /2 = delete | 3 |
| U1 = "us" | 3 |
| /2 = delete | 3 |
| P99 = "p" | 4 |
| /2 = delete | 3 |
| T1 = "to" | 3 |
| /2 = delete | 3 |
| .7 = ".gov" | 3 |
| /2 = delete | 3 |
| /1 = "/" | 3 |
| /2 = delete | 3 |
| M9 = "main" | 3 |
| /2 = delete | 3 |
| P99 = "patents" | 4 |
| /2 = delete | 3 |
| .8 = ".htm" | 3 |
| Total = 56 or a savings of 24% | |

If a rule were set up automatically removing spaces between URLs that begin with a http://www. and end with a special end URL character code then the resulting savings would be greater, as shown in Table 6 below.

TABLE 6

| | |
|---|---|
| H3982 = "http://www." | 6 |
| U1 = "us" | 3 |
| P99 = "p" | 4 |
| T1 = "to" | 3 |
| .7 = ".gov" | 3 |
| /1 = "/" | 3 |
| M9 = "main" | 3 |
| P99 = "patents" | 4 |
| .8 = ".htm" | 3 |
| Total = 32 or a savings of 57% | |

Thus a bar code or matrix code can be improved to contain a much larger and more useful amount of data and be significantly improved while retaining the size and error correction benefits of the original design.

Foreign Language Translation

The present invention may be applied to electronic translation of text into different languages. In accordance with the present invention, a translation process entails translating the words of a document into proxy words that relate to a list of words, replacing the words with the word keys that would represent the given word, combining the word keys into word phrases that can represent a phrase that has a meaning, translating similar phrases in other languages into word keys and creating proxy words and phrases, and using one language as the master language and combining words and phrases from one language to another using this language as a key.

For example, if the phrase "I read a book" is combined into a proxy phrase "I1R8A2B21", then the Spanish phrase "He leído un libro" could be tagged "H3L9U1L32" using English as the master phrase-list with a matching "I1R8A2B21". Similarly the French phrase "J'ai lu un livre" would be tagged "J3L5U1L24". To translate Spanish to French the Spanish phrase "He leído un libro" would first be converted to the proxy phrase "H3L9U1L32" which would then be matched to the English master phraselist proxy "I1R8A2B21" which would then be converted to the French proxy phrase "J3L5U1L24" and converted back to the French phrase "J'ai lu un livre".

In other words, each language has phrases that are compressed using the above-described compression algorithm, wherein Tables 7A, 7B and 7C below show the phrase "I read a book" and its respective compressed form in English, Spanish and French.

TABLE 7A

| English Phrase | Compressed English Phrase |
|---|---|
| I read a book | I1R8A2B21 |

TABLE 7B

| Spanish Phrase | Compressed Spanish Phrase |
|---|---|
| He leído un libro | H3L9U1L32 |

TABLE 7C

| French Phrase | Compressed French Phrase |
|---|---|
| J'ai lu un livre | J3L5U1L24 |

The compressed phrases may be stored in a significantly smaller file, as shown in Table 8 below.

TABLE 8

| Compressed English Phrase | Compressed Spanish Phrase | Compressed French Phrase | Compressed German Phrase |
|---|---|---|---|
| I1R8A2B21 | H3L9U1L32 | J3L5U1L24 | I1L7E2B24 |

Then, to translate from one language to another, the phrase is compressed and looked up in a table (e.g., Table 8 above) using the compressed English phrase as the index to move between the different languages, as shown in Table 9 below

TABLE 9

| French Phrase | Compressed French Phrase | Compressed English Phrase | Compressed Spanish Phrase | Spanish Phrase |
|---|---|---|---|---|
| J'ai lu un livre | J3L5U1L24 | I1R8A2B21 | H3L9U1L32 | He leido un libro |

Since only one copy of each word is needed for an entire language, a master phrase list can be built that can better convert the meanings of various languages in an extremely condensed space. Moreover, further compression may be achieved by creating additional compressed lists that compress the phrase lists. As an example, the tagged phrase for "I read a book", which is shown as "I1R8A2B21", could be added to a phrase list that could be represented with a two letter character, e.g. ID, where "I" represents the subject and "D" represents that a past tense verb is following the subject. The phrase is numbered based upon frequency so that ID9 could represent the entire phrase. Hence, the 13 character phrase "I read a book" may be reduced to 4 characters and 5 numbers (i.e., I1R8A2B21) as described above, and further may be compressed to only 2 characters and 1 number (i.e., ID9). This same concept could be used multiple times for further compression savings.

Extended Applications/Shopping & Coupons

As mentioned above, the present invention may be applied to text/data entry in forms and other documents. In accordance with the present invention, a user creates (or otherwise downloads or copies onto) on the device a shopping list that identifies items to be purchased (e.g., food items such as apples, orange juice, eggs, etc., and non-food items such as toilet paper, razor blades, etc.). The list may be created utilizing various embodiments mentioned above that employ menus that provide words/phrases based on frequency of usage and possibly other factors. By starting with a specialized list such as grocery items, the predictive text system can cut keystrokes by about 80%. As an additional feature specific to shopping lists, the present invention entails downloading of coupons or advertisements to the device as the user builds a list by displaying the media, preferably in the location of the word buttons, after the user enters an item. The media can also be presented while the user is shopping, wherein the particular coupons downloaded (and time of downloading) are based on the items identified in the user's shopping list, the particular location of the user, and the coupons available for download. In one particular implementation of this embodiment, a retail establishment has a wifi system with which the portable device employing the present invention communicates and the location of the portable device within the retail establishment is identified based on known triangulation techniques (e.g., using 3 or more transmitters within the retail establishment).

When the user is located in the vicinity of a product that appears on the user's shopping list, a suitable digital coupon is pushed onto the portable device and displayed, generally in order to encourage the user to purchase the particular brand of the product identified on the coupon. The item can also be highlighted on the shopping list or moved to the top of the list. For example, the user's shopping list includes the product razor blades. When the user is located in an aisle containing razor blades (as known by a facility in wireless communication with the portable device), the facility transmits a suitable coupon that states that, e.g., Gillette Mach 3 blades are on sale with other information such as sales prices. Preferably, the coupon is transmitted to the portable device when the user is disposed reasonably close to the location of the item referenced in the coupon. The user can "accept" the coupon on the portable device, and such acceptance is transmitted to the retail establishment's central computer (or other designated computer) for further handling. The sale price then is provided at checkout if the item on sale is purchased, by using the shoppers loyalty card without the need for the processing/handling of paper coupons. In addition, the retail establishment may broadcast product location information and other data for use by the portable device, as needed.

Alternatively, a shopping list can be transmitted from the portable device to a third party that in turn transmits back available coupons for products identified on or related to the items listed on the shopping list. The user then prints the received coupons for further use. As an optional feature, the portable device guides the user through the store in an efficient manner based on the items identified in the shopping list. The user's list can also be matched against a pricing database providing the user with the best location to purchase the various items on the list, or the user's list can be bid out to various stores to provide cost savings to the user.

Statistical Overview

The key to the successful implementation of predictive text is balancing out the need for the user to be presented with a good chance of their word being displayed with the need to reduce the number of words that must be reviewed to select the word from. Displaying one word has on average only a slightly higher than 20% chance of being the one the user is looking for. This is poor odds, leading many users to turn off their predictive text programs. On the other extreme, if every word starting with that letter were to be shown, there would be 100% chance of it being there, but would be extremely inefficient. We undertook an extensive study analyzing a 400 million word corpus of English to determine the best balance, one where the starting odds are within a couple percentage points of a 50% chance of he word being shown, with the second word having odds of 50% before any keys are entered. As the average sentence has about 15 words, most of the sentence is written with odds approaching 75% with the first words around 50%.

Figure 13A:
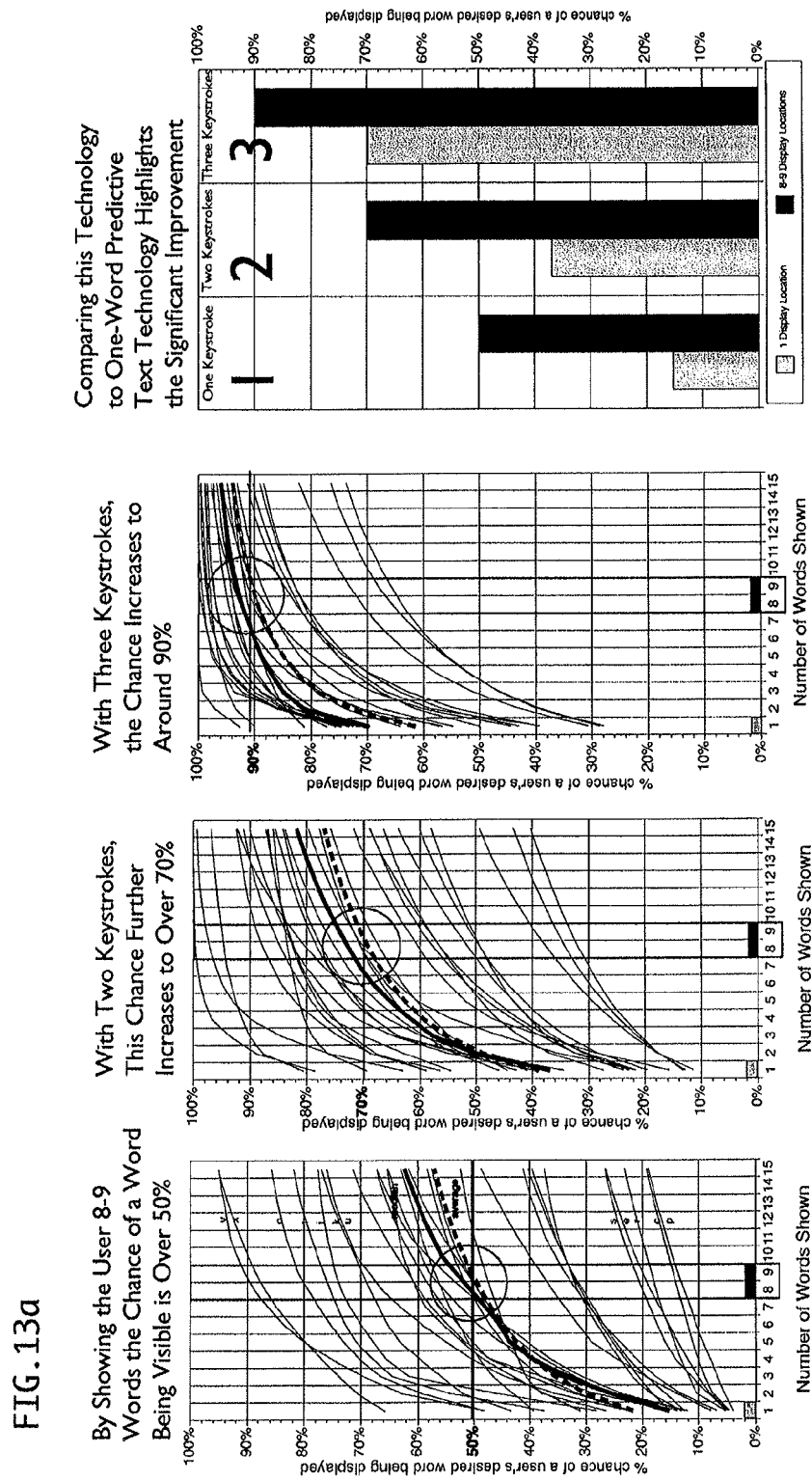

The key finding of our study determined that the desirable results occurred when showing the user 8 or 9 choices and is the basis for the preferred embodiment discussed above. (See FIG. 13a) People read at a rate of 250 words per minute (WPM) and skim even faster. When showing the user 9 words, since there is an over 50% chance that the word is shown, 50% of the time the user will need to read 4.5 words and 50% of the time when the word is not displayed the user will need to read 9 words. On average the user will be reading 6.75 words. Proficient typists on mobile devices tend to type at around 30 WPM. This is about one word every 2 seconds. Reading at 250 WPM would equate to reading a word every 0.25 seconds, so reading 6.75 words on average would take about 1.6 seconds. Thus the reading time balances out with the typing time for efficient mobile device typists, and improves the performance of bad typists, bad spellers, as well as improves the comfort level of most users as more than half of the keystrokes can be removed from typing. While the user can see a benefit while typing the first word, there are significant additional benefits when entering the remaining words of the sentence. After the user enters a word, there is a 50% chance that the next word will be predicted with no additional keystrokes, a significant improvement from current technology. (See FIG. 13b) It can also help a user to communicate in a non-native language such as the one in five Americans whose first language is not English. In addition, this system can help those users who suffer from diseases that affect language skills such as Aphasia that strikes 1 in 250 people and the neurological diseases such as ALS.

CONCLUSION

As described above, the present invention provides various features and advantages in the context of data entry and recognition. Some of the these features are summarized as follows:

1. Providing the user with 8 to 9 boxes of words provides the right balance between presenting the user of the system of the present invention with as few words as possible along with the relatively high probability that the word the user is looking for is provided in the list.

2. Providing the words at a fixed location allows the user to learn where various words will appear thus further increasing the speed at which users can enter text in accordance with the present invention.

3. The selectable dynamic buttons as herein described may also be used to provide functional control of the text, including changing the words shown to upper case, changing tense, displaying a thesaurus for the words shown, and so on.

4. The present invention advantageously allows the user and/or multiple users to incorporate words into the system for quick selection as well as to integrate user specific frequency of words into the statistics.

5. The present invention is adaptable for different languages and includes particular features well suited for Asian languages, as well special features such a partial-word selection (by holding keys down) that are well-suited for languages that have longs words, such as German.

6. The present invention advantageously is well-suited for cellular telephones having the standard 12 keys (i.e., without a QWERTY style keypad) but also is well-suited for both portable and stationary devices that include larger keypads or keyboards (e.g., that have a QWERTY style keyboard).

7. The present invention advantageously employs N-word prediction, as discussed above.

8. The present invention includes a compression algorithm that is based upon the N-gram compression and frequency.

9. The present invention advantageously has the ability to use word and phrase-based compression for purposes of both compression and translation.

10. The present invention advantageously improves optical character recognition.

11. The present invention improves transcription based upon the same process using spoken words and the length of time of a missing word or words.

12. The present invention advantageously improves matrix codes by using the compressed dictionary to make longer words and increase the amount of information that can be contained in matrix codes.

13. The present invention advantageously allows for the transmission of compressed data from sender to receiver where the transmitted data can be uncompressed using the same compression algorithms allowing for transmission savings in line with the compression savings.

14. The present invention may employ a touch sensitive physical keyboard where the surface of the keyboard can be used as a track pad.

15. The present invention may employ multi-press keyboards where a harder push activates the word buttons.

The present invention has been described in the context of multiple embodiments, and multiple features and variations thereof, and with reference to the figures shown in the drawings. It should be understood, however, that the figures are for illustrative purposes only and should not be taken as limitations upon the invention. It is further contemplated that many changes and modifications may be made to the elements and processes described herein by a person of ordinary skill in the art without departing from the spirit and scope of the invention.

Therefore, it is intended that the appended claims be interpreted as including the embodiments described herein, the alternatives mentioned above, and all equivalents thereto.

What is claimed is:

1. A method of improving data input in a portable device having an input device, a display device and a processor operatively coupled to the input device and the display device,
   the portable device implementing the method being a portable device, the input device of the portable device including first and second input devices, the first input device and the display device disposed on a front of the portable device, and the second input device disposed on a back of the portable device, the second input device including means for selecting the selectable dynamic keys associated with the displayed set of words,
   the method comprising:
      ascertaining, by the processor, a set of words for display to a user of the portable device based on an already displayed word by the display device immediately preceding a text insertion point, each of the words in the set being ascertained based on a respective frequency of usage of the respective word with the already displayed word in a predetermined language;
      first displaying, by the display device, each word in the ascertained set in association with a respective selectable dynamic key;
      receiving, by the input device, an input data entry representing selection by the user of one of the selectable dynamic keys;
      second displaying, by the display device, at the text insertion point the respective word in the ascertained set associated with the selected dynamic key as represented by the received input data entry,
   the set of words including nine words displayed in a table having three rows and three columns by the display device, and the second input device includes three buttons disposed on a left portion on the back of the portable cellular device for selecting each of the three words displayed in a left-most column of the table, and the second input device includes three buttons disposed on a right portion on the back of the portable cellular device for selecting each of the three words displayed in a right-most column of the table, and wherein simultaneous depression of respective left and right buttons on the back of the portable cellular device selects each of the three words displayed in a middle column of the table.

2. The method of claim 1, comprising:

receiving, by the input device, another input data entry representing selection by the user of a character in the language;

ascertaining, by the processor, a set of words associated with the character represented by the received another input data entry and also based on an already displayed word preceding the text insertion point; and wherein the receiving of the input data entry and second displaying steps are implemented after ascertaining, by the processor, the set of words associated with the character represented by the received another input data entry.

3. The method of claim 2, wherein words associated with a character correspond to a frequency of usage in the language of words beginning with the associated character.

4. The method of claim 2, wherein receiving, by the input device, of said another input data entry represents selection by the user of a plurality of characters in the language.

5. The method of claim 1, wherein the already displayed word is displayed in a text display portion of the display device, and the ascertained set of words are displayed in a word set display portion of the display device.

6. The method of claim 1, wherein the ascertained set of words are displayed at fixed locations by the display device, whereby word locations associated with each of the words in the set that are displayed are learned by the user in such a manner so as to facilitate more rapid entry by the user using the input device.

7. The method of claim 1, wherein, upon implementing the second displaying step, the ascertaining step is repeated to ascertain a set of words based on the word just displayed by the display device.

8. The method of claim 1, wherein the ascertaining step is carried out by ascertaining the set of words based on a frequency of usage of each of the words in the set with a plurality of words displayed by the display device immediately preceding the text insertion point.

9. The method of claim 1, wherein the ascertaining step is carried out by ascertaining the set of words based on a frequency of usage of each of the words in the set with a plurality of words displayed by the display device immediately preceding the text insertion point and also based upon an analysis of grammar and usage rules.

10. The method of claim 1, comprising storing, in a memory, a plurality of sets of words, each of the stored sets of words identifying words having a relatively high frequency of usage with a respective associated word in the language; and the ascertaining step is carried out by retrieving from the memory the set of words associated with the already displayed word or words.

11. The method of claim 1, comprising providing a current, updated frequency of usage of word combinations; and the ascertaining step is carried out based on the current, updated frequency of usage of word combinations.

12. The method of claim 1, wherein the frequency of usage of words with the already displayed word is based upon frequency of usage by a general public.

13. The method of claim 1, wherein the frequency of usage of words with the already displayed word is based on frequency of usage by a general public in combination with frequency of usage by the user of the portable device.

14. The method of claim 1, wherein the frequency of usage of words with the already displayed word is based on frequency of usage by a plurality of users.

15. The method of claim 1, wherein the frequency of usage of words with the already displayed word is based on a demographic of the user.

16. The method of claim 1, wherein the frequency of usage of words with the already displayed word is based on a frequency of usage statistics pertaining to a current geographic location of the user.

17. The method of claim 1, comprising enabling the user of the portable device to change the text insertion point wherein the ascertaining step is carried out to ascertain the set of words for display to the user based on a displayed word or words immediately preceding the changed text insertion point.

18. The method of claim 1, comprising displaying, by the display device, a set of functional icons corresponding to different actions to be taken by the portable device upon subsequent selection by the user as represented by the input data entry received by the input device.

19. The method of claim 18, wherein one of the functional icons in the set of functional icons corresponds to an action for changing each word in a prior displayed set from lower case to upper case.

20. The method of claim 18, wherein one of the functional icons in the set of functional icons corresponds to deleting an identified word or words displayed by the display device.

21. The method of claim 18, wherein one of the functional icons in the set of functional icons corresponds to displaying a user-predefined set of words in association with the selectable dynamic keys.

22. The method of claim 18, wherein one of the functional icons in the set of functional icons corresponds to displaying a user-predefined set of phrases, each of the phrases associated with a respective selectable dynamic key.

23. The method of claim 18, wherein one of the functional icons in the set of functional icons corresponds to an action for causing the display device to display synonyms of the word at the text insertion point.

24. The method of claim 18, wherein one of the functional icons in the set of functional icons corresponds to an action for causing the display device to change the lemma, add adjectives, or in another way modify the word at the text insertion point.

25. The method of claim 18, wherein one of the functional icons in the set of functional icons corresponds to an action for causing the display device to display a second set of words in association with the selectable dynamic keys, wherein the displayed second set of words are based on a respective frequency of usage of the respective word and integrating data from an address book of the user as stored by the portable device into the second set of words.

26. The method of claim 1, wherein the input device of the portable device has at least keypad elements labeled 1 through 9, wherein selection by the user of one of the keypad elements labeled 1 through 9 represents the selection by the user of one of the selectable dynamic keys.

27. The method of claim 26, wherein the input device of the portable device includes a set of additional selectable elements to enable the user to select a letter using the keypad elements normally representing a number or two or more letters.

28. The method of claim 26, wherein the input device of the portable device includes a rocker button having multiple positions to enable the user to select one of at least four identified choices using one of the keypad elements normally representing a number or two or more letters.

29. The method of claim 26, wherein the ascertaining step is carried out based on a T9 predictive text methodology that uses the frequency of words that could be created based upon any letters that appear on a selected key of a 9-key keypad to populate word keys, or in the case of phones that use two letters in each button, the frequency of words that can be created from either letter of that key.

30. The method of claim 1, wherein the input device of the portable device including a depressable button on a side of the portable device, the method further comprising changing, upon depressing the button on the side of the portable device, a function of a key representing a letter or number to a function for selecting at least one of the selectable dynamic keys.

31. The method of claim 1, wherein the the input device of the portable device including a dual pressure key that, upon depressing the dual pressure key beyond a predetermined location, changes a function of another key representing a letter or number to a function for selecting the selectable dynamic keys.

32. The method of claim 1, comprising displaying, by the display device, word keys or functional icons corresponding to different actions to be taken by the portable device upon subsequent selection color coded to match and represent physical buttons either on a keyboard or cellular keypad.

33. The method of claim 1, comprising receiving, by the input device, a double tapping on a space bar; controlling, by the processor, the display device to display a period key at the text insertion point and to display the selectable dynamic keys to show a most common punctuation that the user of the portable device might choose including a way to enter at least one of bullets and a new paragraph, and controlling the display device to replace a displayed period with a selected punctuation by the user.

34. The method of claim 1, comprising displaying word keys on a computer monitor and selecting one of the displayed word keys by one of an attached mouse and the portable device.

35. The method of claim 1, comprising ascertaining, by the processor, if a non-text entry immediately precedes the text insertion point, a set of words for display to the user of the portable device based upon the most likely starting words that follow the non-text entry immediately preceding the text insertion point; and ascertaining, by the processor, if there is no text and entries immediately preceding the text insertion point, a set of words for display to the user of the portable device based upon the most common words used to begin a document.

36. A method of improving data input in a portable device having an input device, a display device and a processor operatively coupled to the input device and the display device, the display device and the input device incorporated within a touch-sensitive display, the method comprising:
ascertaining, by the processor, a set of words for display to a user of the portable device based on an already displayed word by the display device immediately preceding a text insertion point, each of the words in the set being ascertained based on a respective frequency of usage of the respective word with the already displayed word in a predetermined language;
first displaying, by the display device, each word in the ascertained set in association with a respective selectable dynamic key;
receiving, by the input device, an input data entry representing selection by the user of one of the selectable dynamic keys;
second displaying, by the display device, at the text insertion point the respective word in the ascertained set associated with the selected dynamic key as represented by the received input data entry,
the set of words including nine words displayed in a table having three rows and three columns by the display device, and the second input device includes three buttons disposed on a left portion on the back of the portable cellular device for selecting each of the three words displayed in a left-most column of the table, and the second input device includes three buttons disposed on a right portion on the back of the portable cellular device for selecting each of the three words displayed in a right-most column of the table, and wherein simultaneous depression of respective left and right buttons on the back of the portable cellular device selects each of the three words displayed in a middle column of the table; and
displaying by the touch-sensitive display each of the letters of the language as a separate input element in three rows, consonant letters of the language displayed in upper and lower rows and vowel letters of the language displayed in a middle row between the upper and lower rows.

37. A portable device for improving data input, comprising:
a display device for displaying one or more words to a user of the portable device, the display device including a text insertion point;
an input device operative to receive an input by the user and to produce an input data entry identifying the user input; and
a processor operatively coupled to the display device and the input device, and programmed to:
ascertain a set of words for display to a user based on an already displayed word by the display device immediately preceding the text insertion point, each of the words in the set being ascertained based on a respective frequency of usage of the respective word with the already displayed word in a predetermined language;
control the display device to display each word in the ascertained set in association with a respective selectable dynamic key;
receive from the input device an input data entry representing selection by the user of one of the selectable dynamic keys; and
control the display device to display at the text insertion point the respective word in the ascertained set associated with the selected dynamic key as represented by the received input data entry, the input device of the portable device including first and second input devices, the first input device and the display device disposed on a front of the portable device, and the second input device disposed on a back of the portable device, the second input device including means for selecting the selectable dynamic keys associated with the displayed set of words, the set of words including nine words displayed in a table having three rows and three columns by the display device, and the second input device includes three buttons disposed on a left portion on the back of the portable device for selecting each of the three words displayed in a left-most column of the table, and the second input device includes three buttons disposed on a right portion on the back of the portable device for selecting each of the three words displayed in a right-most column of the table, and wherein simultaneous depression of respective left and right buttons on the back of the portable device selects each of the three words displayed in a middle column of the table.

38. The portable device of claim 37, wherein the input device is operative to receive an input by the user representing selection by the user of a character in the language; and the processor is programmed to ascertain a set of words associated with the selected character and also based on an already displayed word preceding the text insertion point, and to control the display device to display the words in the ascertained set for subsequent selection by the user.

39. The portable device of claim 38, wherein words associated with a character correspond to a frequency of usage in the language of words beginning with the character.

40. The portable device of claim 38, wherein the input device is operative to receive input by the user representing a plurality of characters in the language.

41. The portable device of claim 37, wherein the already displayed word is displayed in a text display portion of the display device, and the ascertained set of words are displayed in a word set display portion of the display device.

42. The portable device of claim 37, wherein the ascertained set of words are displayed at fixed locations by the display device, whereby word locations associated with each of the words in the set that are displayed are learned by the user in such a manner so as to facilitate more rapid entry by the user using the input device.

43. The portable device of claim 37, wherein, upon displaying the respective word in the ascertained set at the text insertion point, the processor ascertains another set of words based on the word just displayed.

44. The portable device of claim 37, wherein the processor ascertains the set of words based on a frequency of usage of each of the words in the set with a plurality of words displayed immediately preceding the text insertion point.

45. The portable device of claim 37, wherein the processor ascertains the set of words based on a frequency of usage of each of the words in the set with a plurality of words displayed by the display device immediately preceding the text insertion point and also based upon an analysis of grammar and usage rules.

46. The portable device of claim 37, comprising a memory for storing a plurality of sets of words, each of the stored sets of words identifying words having a relatively high frequency of usage with a respective associated word in the language; and the processor retrieves from the memory the set of words associated with the already displayed word or words.

47. The portable device of claim 37, wherein the processor receives a current, updated frequency of usage of word combinations, and ascertains the words based on the current, updated frequency of usage of word combinations.

48. The portable device of claim 37, wherein the frequency of usage of words with the already displayed word is based upon frequency of usage by a general public.

49. The portable device of claim 37, wherein the frequency of usage of words with the already displayed word is based on frequency of usage by a general public in combination with frequency of usage by the user of the portable device.

50. The portable device of claim 37, wherein the frequency of usage of words with the already displayed word is based on frequency of usage by a plurality of users.

51. The portable device of claim 37, wherein the frequency of usage of words with the already displayed word is based on a demographic of the user.

52. The portable device of claim 37, wherein the frequency of usage of words with the already displayed word is based on a frequency of usage statistics pertaining to a current geographic location of the user.

53. The portable device of claim 37, wherein the processor is programmed to enable the user to change the text insertion point, and ascertains the set of words for display to the user based on a displayed word immediately preceding the changed text insertion point.

54. The portable device of claim 37, wherein the processor is programmed to control the display device to display a set of functional icons corresponding to different actions to be taken by the processor upon subsequent selection by the user.

55. The portable device of claim 54, wherein one of the functional icons in the set of functional icons corresponds to an action for changing each word in a prior displayed set from lower case to upper case.

56. The portable device of claim 54, wherein one of the functional icons in the set of functional icons corresponds to deleting an identified word or words displayed by the display device.

57. The portable device of claim 54, wherein one of the functional icons in the set of functional icons corresponds to displaying a user-predefined set of words in association with the selectable dynamic keys.

58. The portable device of claim 54, wherein one of the functional icons in the set of functional icons corresponds to displaying a user-predefined set of phrases, each of the phrases associated with a respective selectable dynamic key.

59. The portable device of claim 54, wherein one of the functional icons in the set of functional icons corresponds to an action for causing the display device to display synonyms of the word at the text insertion point.

60. The portable device of claim 54, wherein one of the functional icons in the set of functional icons corresponds to an action for causing the display device to change the lemma, add adjectives, or in other ways modify the word at the text insertion point.

61. The portable device of claim 54, wherein one of the functional icons in the set of functional icons corresponds to an action for causing the display device to display a second set of words in association with the selectable dynamic keys, wherein the displayed second set of words are based on a respective frequency of usage of the respective word taking into account data from an address book of the user as stored by the portable device.

62. The portable device of claim 37, wherein the portable device has at least keypad elements labeled 1 through 9, wherein selection by the user of one of the keypad elements labeled 1 through 9 represents the selection by the user of one of the selectable dynamic keys.

63. The portable device of claim 62, wherein the input device of the portable device includes a set of additional selectable elements to enable the user to select a letter using the keypad elements normally representing a number or two or more letters.

64. The portable device of claim 62, wherein the input device includes a rocker button having multiple positions to enable the user to select one of at least four identified choices using one of the keypad elements normally representing a number or two or more letters.

65. The portable device of claim 62, wherein the processor ascertains the words based on a T9 predictive text methodology that uses the frequency of words that could be created based upon any letters that appear on a selected key of a 9-key keypad to populate word keys, or in the case of phones that use two letters in each button, the frequency of words that can be created from either letter of that key.

66. The system of claim 37, wherein the input device of the portable device including a depressable button on a side of the portable device, wherein the processor changes, upon depressing the button on the side of the portable device, a function of a key representing a letter or number to a function for selecting at least one of the selectable dynamic keys.

67. The portable device of claim 37, wherein the input device of the portable device including a dual pressure key that, upon depressing the dual pressure key beyond a predetermined location, changes a function of another key representing a letter or number to a function for selecting the selectable dynamic keys.

68. The portable device of claim 37, wherein the display device displays a set of word keys color coded to match and represent physical buttons on one of a keyboard and cellular keypad.

69. The portable device of claim 37, wherein the processor is programmed to control the display device to display a period key at the text insertion point upon receiving, by the input device, a double tapping on a space bar, to display the selectable dynamic keys to show a most common punctuation that the user of the portable device might choose including a way to enter at least one of bullets and a new paragraph, and to display a selected one of the displayed punctuation in place of a displayed period.

70. The portable device of claim 37, comprising a computer monitor displaying word keys; and at least one of an attached mouse and the portable device adapted to select one of the displayed word keys.

71. The portable device of claim 37, wherein the processor is programmed to control the display device to display, if a non-text entry immediately precedes the text insertion point, a set of words based upon the most likely starting words that follow the non-text entry immediately preceding the text insertion point; and to control the display device to display, if there is no text and entries immediately preceding the text insertion point, a set of words based upon the most common words used to begin a document.

72. A portable device for improving data input, comprising:
 a display device for displaying one or more words to a user of the portable device, the display device including a text insertion point;
 an input device operative to receive an input by the user and to produce an input data entry identifying the user input; and
 a processor operatively coupled to the display device and the input device, and programmed to:
  ascertain a set of words for display to a user based on an already displayed word by the display device immediately preceding the text insertion point, each of the words in the set being ascertained based on a respective frequency of usage of the respective word with the already displayed word in a predetermined language;
  control the display device to display each word in the ascertained set in association with a respective selectable dynamic key;
  receive from the input device an input data entry representing selection by the user of one of the selectable dynamic keys; and
  control the display device to display at the text insertion point the respective word in the ascertained set associated with the selected dynamic key as represented by the received input data entry,
  the set of words including nine words displayed in a table having three rows and three columns by the display device, and the second input device includes three buttons disposed on a left portion on the back of the portable cellular device for selecting each of the three words displayed in a left-most column of the table, and the second input device includes three buttons disposed on a right portion on the back of the portable cellular device for selecting each of the three words displayed in a right-most column of the table, and wherein simultaneous depression of respective left and right buttons on the back of the portable cellular device selects each of the three words displayed in a middle column of the table;
 the display device and the input device being incorporated within a touch-sensitive display, and
 the input device is operative to display within the touch-sensitive display each of the letters of the language as a separate input element in three rows, consonant letters of the language disposed in upper and lower rows and vowel letters of the language disposed in a middle row between the upper and lower rows.

* * * * *